US012127192B2

(12) United States Patent
Kim et al.

(10) Patent No.: US 12,127,192 B2
(45) Date of Patent: Oct. 22, 2024

(54) METHOD AND APPARATUS FOR TRANSMITTING OR RECEIVING WIRELESS SIGNALS IN WIRELESS COMMUNICATION SYSTEM

(71) Applicant: LG Electronics Inc., Seoul (KR)

(72) Inventors: Seonwook Kim, Seoul (KR); Suckchel Yang, Seoul (KR); Changhwan Park, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 429 days.

(21) Appl. No.: 17/599,960

(22) PCT Filed: Mar. 30, 2020

(86) PCT No.: PCT/KR2020/004381
§ 371 (c)(1),
(2) Date: Sep. 29, 2021

(87) PCT Pub. No.: WO2020/204561
PCT Pub. Date: Oct. 8, 2020

(65) Prior Publication Data
US 2022/0174707 A1 Jun. 2, 2022

(30) Foreign Application Priority Data

Mar. 29, 2019 (KR) ........................ 10-2019-0036677
Jan. 31, 2020 (KR) ........................ 10-2020-0012163

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/0446* (2013.01); *H04W 72/23* (2023.01)

(58) Field of Classification Search
CPC ............. H04W 72/1273; H04W 72/23; H04W 72/0446; H04L 1/1812; H04L 5/0053
See application file for complete search history.

(56) References Cited

U.S. PATENT DOCUMENTS

2016/0212734 A1* 7/2016 He ........................... H04L 5/14
2017/0048026 A1* 2/2017 Park ...................... H04L 1/1812
2018/0019843 A1* 1/2018 Papasakellariou .... H04L 1/1854

FOREIGN PATENT DOCUMENTS

KR    1020160065220    6/2016

OTHER PUBLICATIONS

Ericsson, "Scheduling of multiple DL/UL transport blocks in LTE-MTC," R1-1901739, 3GPP TSG-RAN WG1 Meeting #96, Athens, Greece, dated Feb. 25-Mar. 1, 2019, 11 pages.

(Continued)

*Primary Examiner* — Duc C Ho
(74) *Attorney, Agent, or Firm* — Fish & Richardson P.C.

(57) ABSTRACT

The present invention relates to a wireless communication system and, specifically, to a method and an apparatus therefor, the method comprising the steps of: receiving configuration information related to the maximum number N (N>1) of PDSCHs that can be scheduled by single DCI through a higher layer signal; receiving DCI having scheduling information for K (K<=N) PDSCHs; and transmitting a HARQ-ACK codebook including N pieces of HARQ-ACK information as a response to the K PDSCHs, on the basis of the configuration information.

18 Claims, 20 Drawing Sheets

(51) Int. Cl.
    *H04L 5/00*         (2006.01)
    *H04W 72/0446*    (2023.01)
    *H04W 72/23*      (2023.01)

(56) References Cited

OTHER PUBLICATIONS

Intel Corporation, "Enhancements to HARQ for NR-unlicensed," R1-1902473, 3GPP TSG RAN WG1 Meeting #96, Athens, Greece, dated Feb. 25- Mar. 1, 2019, 9 pages.
International Search Report and Written Opinion in International Appln. No. PCT/KR2020/004381, dated Jul. 20, 2020, 14 pages (with English translation).
LG Electronics, "Discussion on multiple transport blocks scheduling in MTC," R1-1902057, 3GPP TSG RAN WG1 #96, Athens, Greece, dated Feb. 25-Mar. 1, 2019, 11 pages.
Sony, "On transmission of multiple DL transport blocks," R1-1902193, 3GPP TSG RAN WG1 Meeting #96, Athens, Greece, dated Feb. 25-Mar. 1, 2019, 8 pages.

\* cited by examiner

-- Prior Art --

METHOD AND APPARATUS FOR TRANSMITTING OR RECEIVING WIRELESS SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2020/004381, filed on Mar. 30, 2020, which claims the benefit of Korean Application Nos. 10-2020-0012163, filed on Jan. 31, 2020, and 10-2019-0036677, filed on Mar. 29, 2019. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

Provided are a method and apparatus for efficiently performing a wireless signal transmission and reception process.

It will be appreciated by persons skilled in the art that the objects that could be achieved with the present disclosure are not limited to what has been particularly described hereinabove and the above and other objects that the present disclosure could achieve will be more clearly understood from the following detailed description.

In first technical aspect of the present disclosure, provided is a method of transmitting a wireless signal by a user equipment in a wireless communication system, the method including receiving a configuration information related to a maximum number N (>1) of a Physical Downlink Shared Channel (PDSCH) schedulable by a single Downlink Control Information (DCI) via a higher layer signal, receiving a DCI having a scheduling information on K (≤N) PDSCHs, and transmitting an HARQ-ACK codebook including N Hybrid Automatic Repeat Request-Acknowledgement (HARQ-ACK) informations in response to the K PDSCHs based on the configuration information.

In second technical aspect of the present disclosure, provided is a user equipment used in a wireless communication system, the user equipment including at least one processor and at least one computer memory operatively connected to the at least one processor and enabling the at least one processor to perform an operation when executed, the operation including receiving a configuration information related to a maximum number N (>1) of a Physical Downlink Shared Channel (PDSCH) schedulable by a single Downlink Control Information (DCI) via a higher layer signal, receiving a DCI having a scheduling information on K (≤N) PDSCHs, and transmitting an HARQ-ACK codebook including N Hybrid Automatic Repeat Request-Acknowledgement (HARQ-ACK) informations in response to the K PDSCHs based on the configuration information.

In third technical aspect of the present disclosure, provided is an apparatus for a user equipment, the apparatus including at least one processor and at least one computer memory operatively connected to the at least one processor and enabling the at least one processor to perform an operation when executed, the operation including receiving a configuration information related to a maximum number N (>1) of a Physical Downlink Shared Channel (PDSCH) schedulable by a single Downlink Control Information (DCI) via a higher layer signal, receiving a DCI having a scheduling information on K (≤N) PDSCHs, and transmitting an HARQ-ACK codebook including N Hybrid Automatic Repeat Request-Acknowledgement (HARQ-ACK) informations in response to the K PDSCHs based on the configuration information.

In fourth technical aspect of the present disclosure, provided is a computer-readable storage medium including at least one computer program enabling the at least one processor to perform an operation when executed in the fourth aspect of the present disclosure, the operation including receiving a configuration information related to a maximum number N (>1) of a Physical Downlink Shared Channel (PDSCH) schedulable by a single Downlink Control Information (DCI) via a higher layer signal, receiving a DCI having a scheduling information on K (≤N) PDSCHs, and transmitting an HARQ-ACK codebook including N Hybrid Automatic Repeat Request-Acknowledgement (HARQ-ACK) informations in response to the K PDSCHs based on the configuration information.

In fifth technical aspect of the present disclosure, provided is a method of receiving a wireless signal by a base station in a wireless communication system, the method including transmitting a configuration information related to a maximum number N (>1) of a Physical Downlink Shared Channel (PDSCH) schedulable by a single Downlink Control Information (DCI) via a higher layer signal, transmitting a DCI having a scheduling information on K (≤N) PDSCHs, and receiving an HARQ-ACK codebook including N Hybrid Automatic Repeat Request-Acknowledgement (HARQ-ACK) informations in response to the K PDSCHs based on the configuration information.

In sixth technical aspect of the present disclosure, provided is a user equipment used in a wireless communication system, the user equipment including at least one processor and at least one computer memory operatively connected to the at least one processor and enabling the at least one processor to perform an operation when executed, the operation including transmitting a configuration information related to a maximum number N (>1) of a Physical Downlink Shared Channel (PDSCH) schedulable by a single Downlink Control Information (DCI) via a higher layer signal, transmitting g a DCI having a scheduling information on K (≤N) PDSCHs, and receiving an HARQ-ACK codebook including N Hybrid Automatic Repeat Request-Acknowledgement (HARQ-ACK) informations in response to the K PDSCHs based on the configuration information.

Preferably, the K PDSCHs may be received on different cells in a same slot, respectively.

Preferably, the K PDSCHs may be received in different cells of a same cell, respectively.

Preferably, the DCI may further include a first Downlink Assignment Index (DAI) and the first DAI may indicate a value related to a scheduling order and may be changed in DCI unit.

Preferably, the DCI may further include a first Downlink Assignment Index (DAI) and a second DAI, the first DAI may indicate a value related to a scheduling order in PDSCH unit with reference to a reception timing of the DCI, and the second DAI may indicate a value related to a total scheduling number in PDSCH unit with reference to a reception timing of a PDSCH last received among the K PDSCHs.

According to the present disclosure, a wireless signal may be efficiently transmitted and received in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, illustrate embodiments of the present disclosure and together with the description serve to explain the principle of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
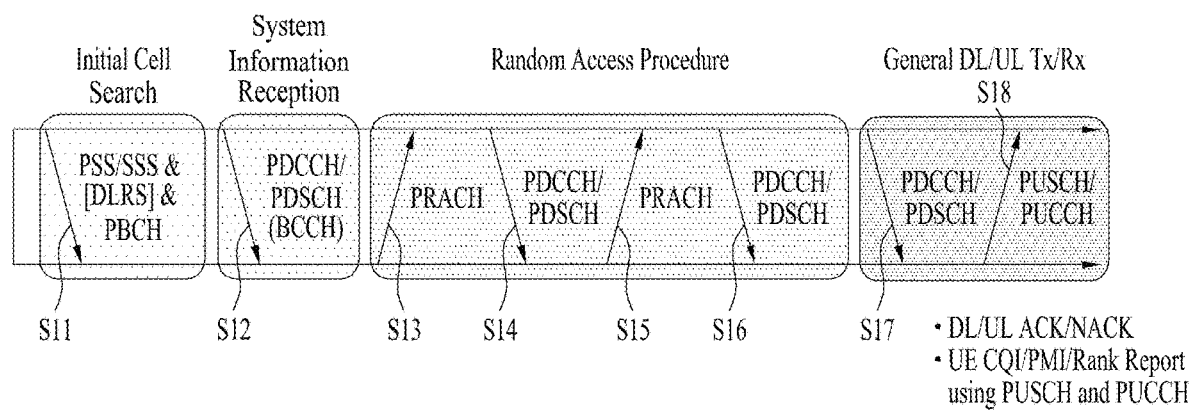
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S101). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

Subsequently, to complete connection to the BS, the UE may perform a random access procedure with the BS (S103 to S106). Specifically, the UE may transmit a preamble on a physical random access channel (PRACH) (S103) and may receive a PDCCH and a random access response (RAR) for the preamble on a PDSCH corresponding to the PDCCH (S104). The UE may then transmit a physical uplink shared channel (PUSCH) by using scheduling information in the RAR (S105), and perform a contention resolution procedure including reception of a PDCCH and a PDSCH signal corresponding to the PDCCH (S106).

After the above procedure, the UE may receive a PDCCH and/or a PDSCH from the BS (S107) and transmit a physical uplink shared channel (PUSCH) and/or a physical uplink control channel (PUCCH) to the BS (S108), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
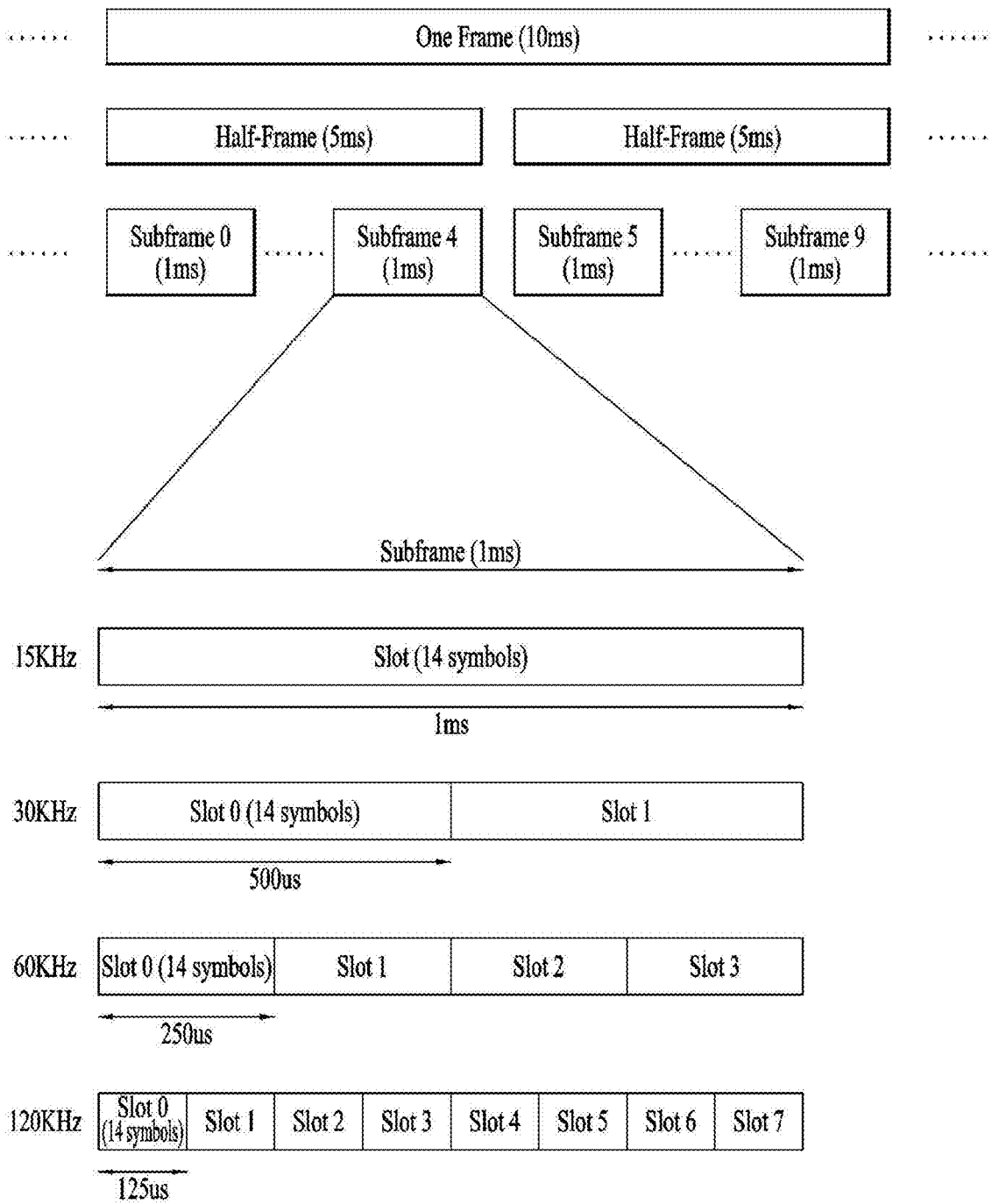
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells. A symbol may include an OFDM symbol (or a CP-OFDM symbol) and an SC-FDMA symbol (or a discrete Fourier transform-spread-OFDM (DFT-s-OFDM) symbol).

NR may support various numerologies (or subcarrier spacings (SCSs)) to provide various 5G services. For example, NR may support a wide area in conventional cellular bands in an SCS of 15 kHz and support a dense urban area and a wide carrier bandwidth with lower latency in an SCS of 30/60 kHz. In an SCS of 60 kHz or above, NR may support a bandwidth higher than 24.25 GHz to overcome phase noise.

NR frequency bands may be divided into two frequency ranges: frequency range 1 (FR1) and frequency range 2 (FR2). FR1 and FR2 may be configured as shown in Table 3 below. FR 2 may mean a millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
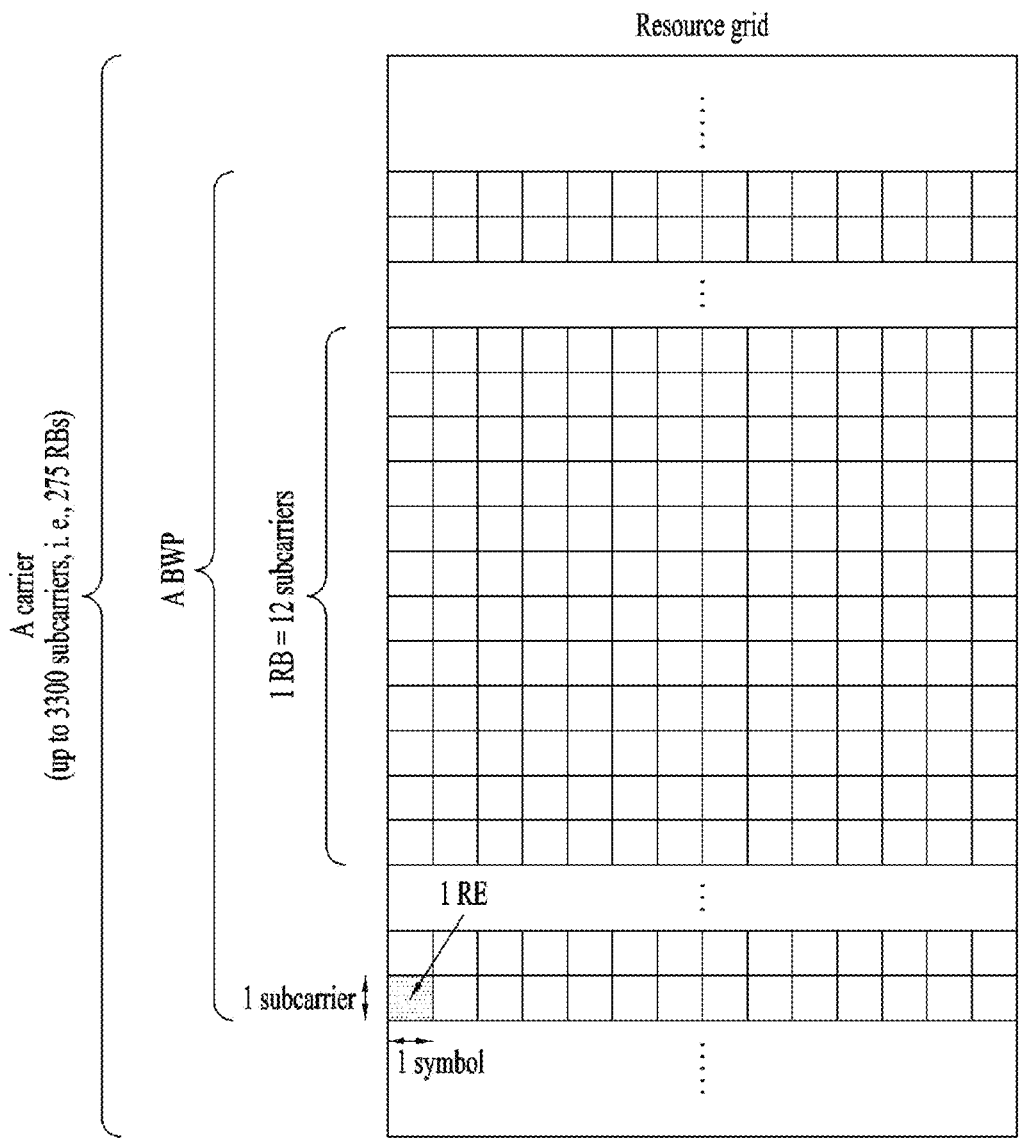
FIG. 3 illustrates a resource grid of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
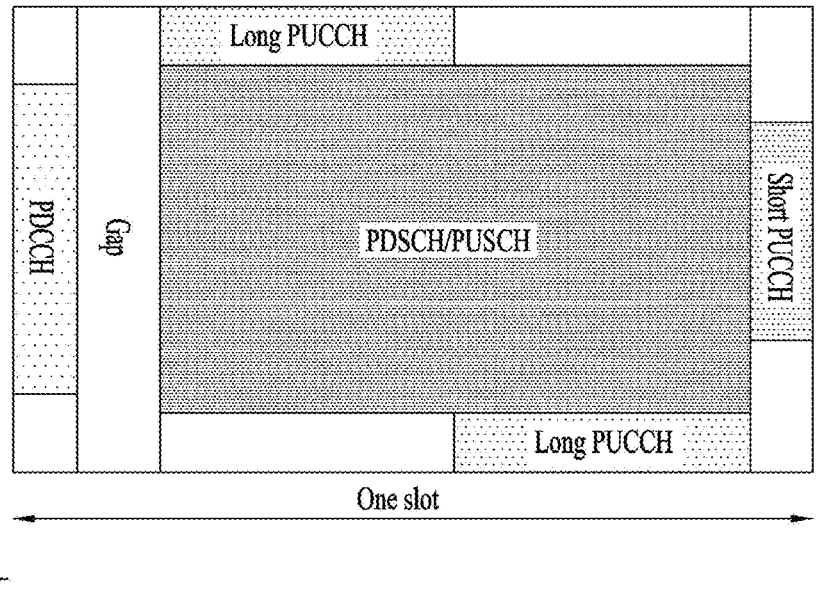
FIG. 4 illustrates mapping of physical channels in a slot.

FIG. 4 illustrates a structure of a slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel (e.g., PDCCH), and the last M symbols (hereinafter, UL control region) in the slot may be used to transmit a UL control channel (e.g., PUCCH). N and M are integers greater than or equal to 0. A resource region (hereinafter, a data region) that is between the DL control region and the UL control region may be used for DL data (e.g., PDSCH) transmission or UL data (e.g., PUSCH) transmission. The GP provides a time gap for the BS and UE to transition from the transmission mode to the reception mode or from the reception mode to the transmission mode. Some symbols at the time of DL-to-UL switching in a subframe may be configured as the GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 4 illustrates exemplary PUCCH formats. PUCCH formats may be divided into short PUCCHs (Formats 0 and 2) and long PUCCHs (Formats 1, 3, and 4) based on PUCCH transmission durations.

TABLE 4

| PUCCH format | Length in OFDM symbols $N^{PUCCH}_{symb}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ CSI, [SR] | DFT-s-OFDM (Pre DFT OCC) |

Figure 5:
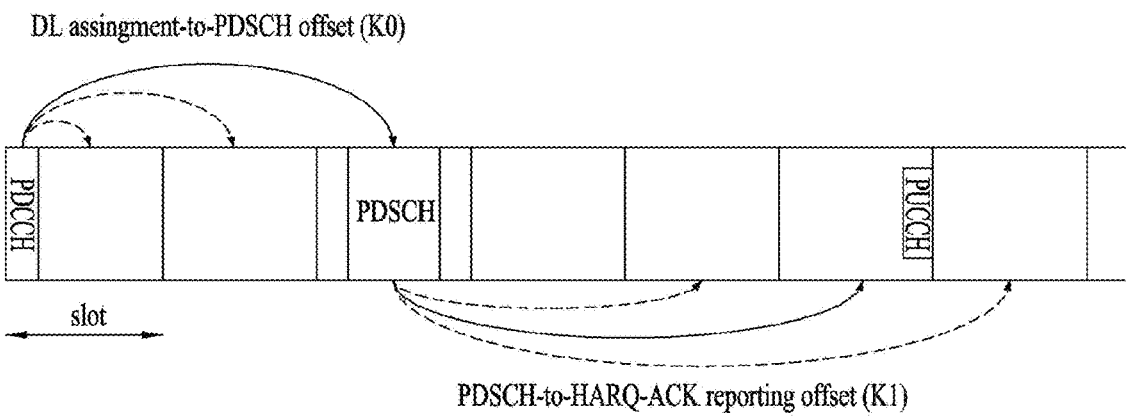
FIG. 5 illustrates an acknowledgment/negative acknowledgment (ACK/NACK) transmission process.

FIG. 5 illustrates an ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB (Transport Block)).

PUCCH resource indicator (PRI): Indicates PUCCH resource used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 6:
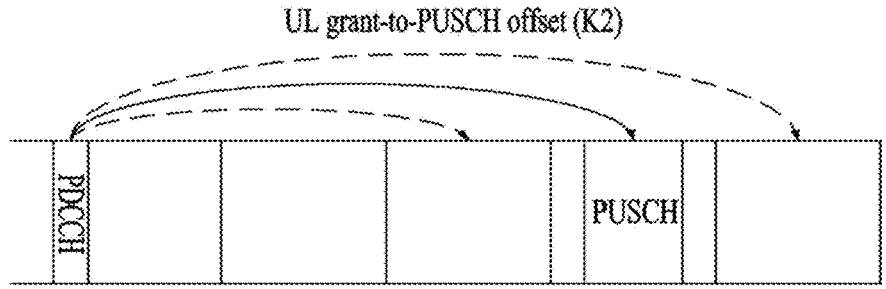
FIG. 6 illustrates a physical uplink shared channel (PUSCH) transmission process.

FIG. 6 illustrates an exemplary PUSCH transmission process. Referring to FIG. 6, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB. When PUCCH transmission time and PUSCH transmission time overlaps, UCI can be transmitted via PUSCH (PUSCH piggyback)

Figure 7:
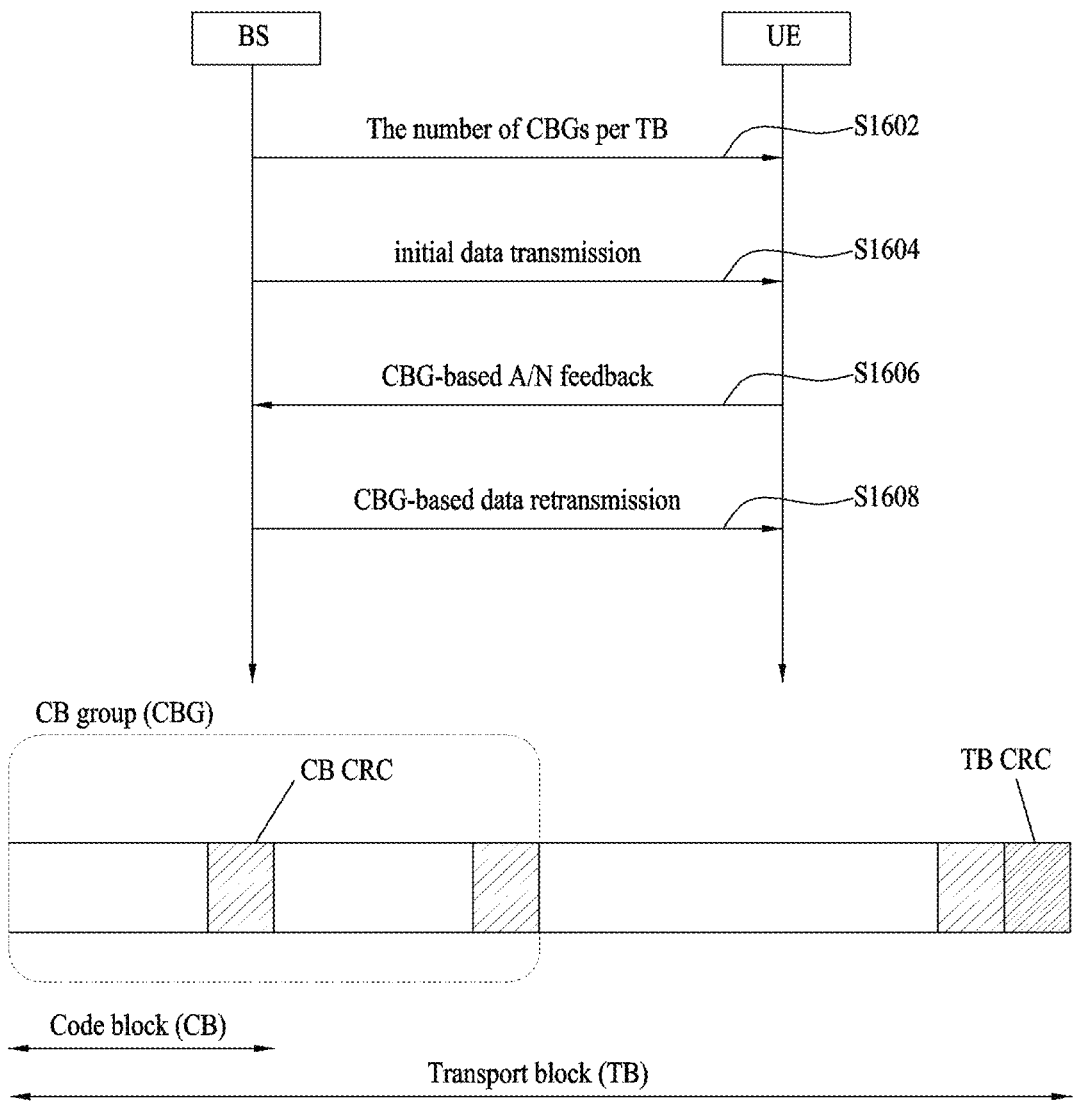
FIG. 7 illustrates Code Block Group-based (CBG-based) Hybrid ARQ (HARQ) process.

FIG. 7 illustrates Code Block Group-based (CBG-based) Hybrid ARQ (HARQ) process. Data scheduling in a CBG-based HARQ process and a corresponding HARQ process may be performed in unit of TB.

Referring to FIG. 7, a User Equipment (UE)) may receive information on the number M of code block groups per transport block from a Base Station (BS) via a higher layer signal (e.g., RRC signal) [S1602]. Thereafter, the UE may receive data initial transmission from the BS (on PDSCH) [S1604]. Here, data includes a transport block, the transport block includes a plurality of code blocks, and a plurality of the code blocks may be classified into one or more code block groups. Here, some of the code block group may include 'ceiling (K/M)' code blocks and the rest of the code block group may include 'flooring (K/M)' code blocks. K indicates the number of code blocks in data. Thereafter, the UE may feed back code block group-based A/N information with respect to the data to the BS [S1606], and the BS may perform data retransmission based on the code block group [S1608]. A/N information may be transmitted on PUCCH or PUSCH. Here, the A/N information includes a plurality of A/N bits with respect to the data, and each of the A/N bits may indicate each A/N response generated in unit of code block group with respect to the data. A payload size of the A/N information may be identically maintained based on M irrespective of the number of code block groups configuring the data.

NR supports a semi-static HARQ-ACK codebook scheme (NR Type-1 HARQ-ACK codebook and a dynamic HARQ-ACK codebook scheme (NR Type-2 HARQ-ACK codebook). HARQ-ACK (or A/N) codebook may be substituted with HARQ-ACK payload.

In case that a semi-static codebook scheme is configured, a size of A/N codebook is fixed (to a maximum value) irrespective of the number of actually scheduled DL data. Specifically, (maximum) A/N payload (size) transmitted on single PUCCH within a single slot may be determined as the A/N bit number corresponding to a combination (hereinafter, a bundling window) of all CCs configured for a UE and all DL scheduling slots (or PDSCH transmission slots or PDCCH monitoring slots) capable of indicating the A/N transmission timing. For example, PDSCH-to-A/N timing information is included in DL grant DCI (PDCCH), and the PDSCH-to-A/N timing information may have one (e.g., k) of a plurality of values. For example, if PDSCH is received in slot #m and PDSCH-to-A/N timing information scheduling the PDSCH indicates k, A/N information on the PDSCH may be transmitted in slot #(m+k). For example, it may be given as k∈{1, 2, 3, 4, 5, 6, 7, 8}. Meanwhile, when A/N information is transmitted in slot #n, the A/N information may include maximum A/N available with reference to a bundling window. Namely, A/N information of slot #n may include A/N corresponding to slot #(n−k). For example, when k∈{1, 2, 3, 4, 5, 6, 7, 8}, A/N information of slot #n includes A/N corresponding to slot #(n−8)~slot #(n−1) irrespective of actual DL data reception (i.e., maximum number of A/N).

In case that a dynamic HARQ-ACK codebook scheme is configured, an A/N codebook size varies depending on the actually scheduled DL data number. For example, an A/N codebook size adaptively varies based on a actually scheduled CC and/or slot. The dynamic HARQ-ACK codebook scheme may reduce HARQ-ACK payload mismatch between a BS and a UE by signaling a Downlink Assignment Indicator (DAI) value via DL assignment. DAI includes Counter-DAI (C-DAI) and Total-DAI (T-DAI). C-DAI may provide information indicating that currently scheduled DL data is what numberth DL data, and T-DAI may indicate information on the total number of scheduled DL data so far. Hence, HARQ-ACK codebook may be determined based on C-DAI/T-DAI value. For example, a HARQ-ACK codebook size may be determined based on a T-DAI value, and a position of HARQ-ACK bit(s) in the HARQ-ACK codebook may be determined based on a C-DAI value (e.g., corresponding HARQ-ACK bit(s) may be arranged in order of an increasing C-DAI value).

T-DAI may be included in DL assignment only if a plurality of cells (or Component Carriers (CCs)) are aggregated. IF a plurality of cells are aggregated, C-DAI indicates a {cell, slot} scheduling order value counted by a cell-first (or CC-first) scheme, and is used to designate a position of A/N bit in A/N codebook. T-DAI indicates a slot-unit scheduling cumulative value up to a current slot and is used to determine a size of A/N codebook. Specifically, each of a size of a C-DAI field and a size of a T-DAI field in DL assignment may include 2 bits. In this case, the value (0~3) of the C-DAI field may correspond to '(scheduling order mod 2)−1' and the value (0~3) of the T-DAI field may correspond to '(scheduling number order mod 2)−1'.

Whether to use a semi-static HARQ codebook method oa a dynamic HARQ codebook method may be configured in advance by higher layer signaling (e.g., RRC signaling).

Embodiment: Multi-DL Scheduling & HARQ-ACK Feedback

Figure 8:
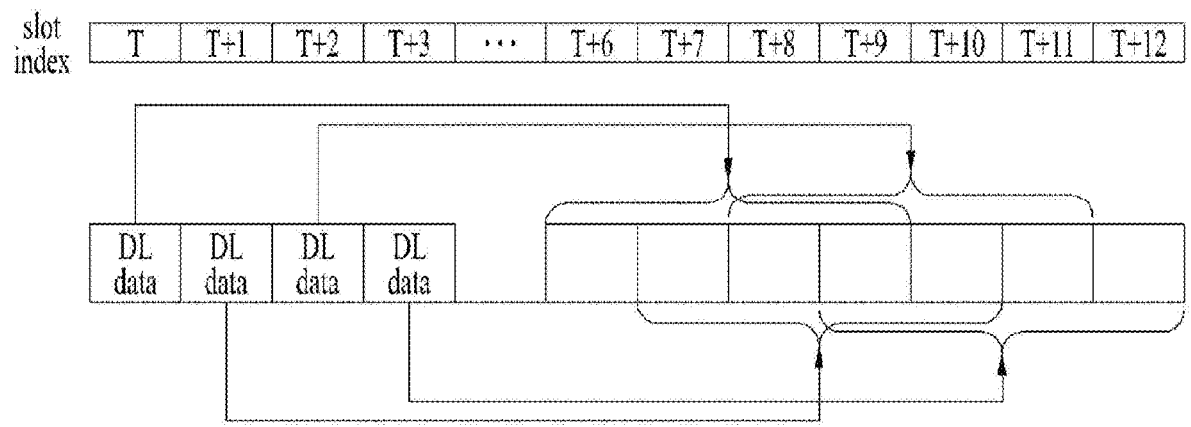
FIGS. 8 to 11 illustrate data scheduling and HARQ-ACK feedback.

FIG. 8 shows an example of an HARQ-ACK transmitting process with respect to DL data. Referring to FIG. 8, an HARQ-ACK timing corresponding to one DL data is determined as one of value in a pre-configured HARQ-ACK timing set, and the corresponding value may be dynamically indicated via DL assignment. In this case, HARQ-ACK information transmitted in a specific slot may correspond to DL data of several slots. For example, four HARQ timings are pre-configured by higher layer (e.g., RRC) signaling, and an HARQ-ACK transmission timing corresponding to DL data of slot #T may be indicated as one of slots #T+6~#T+9 based on DL assignment information. In this case, HARQ-ACK corresponding to several DL data may be transmitted in a single slot. For example, HARQ-ACK information corresponding to DL data of slot #T, slot #T+1, slot #T+2 and/or slot #T+3 may be transmitted in slot #T+9.

Figure 9:
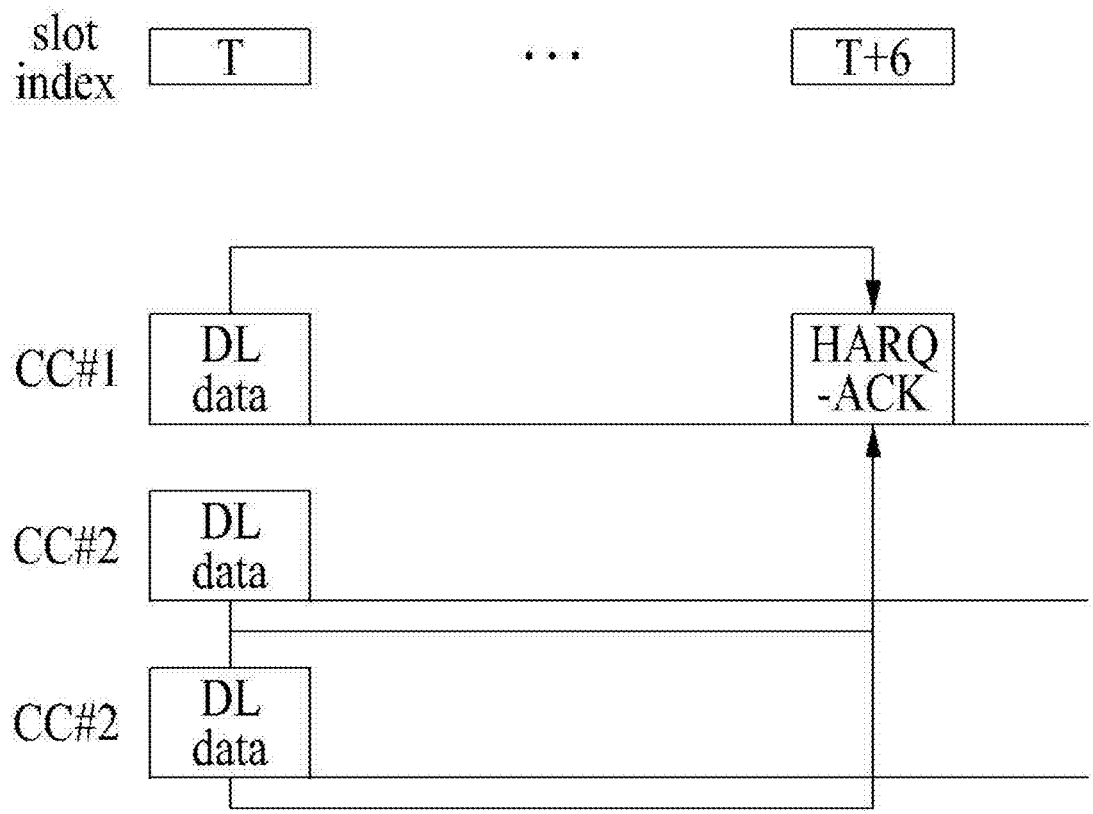

In addition, in a Carrier Aggregation (CA) environment, as shown in FIG. 9, HARQ-ACK information corresponding to DL data on several CCs (or cells) may be transmitted in a specific slot on a single specific CC (e.g., Primary CC (PCC) or Primacy Cell (PCEll).

Figure 10:
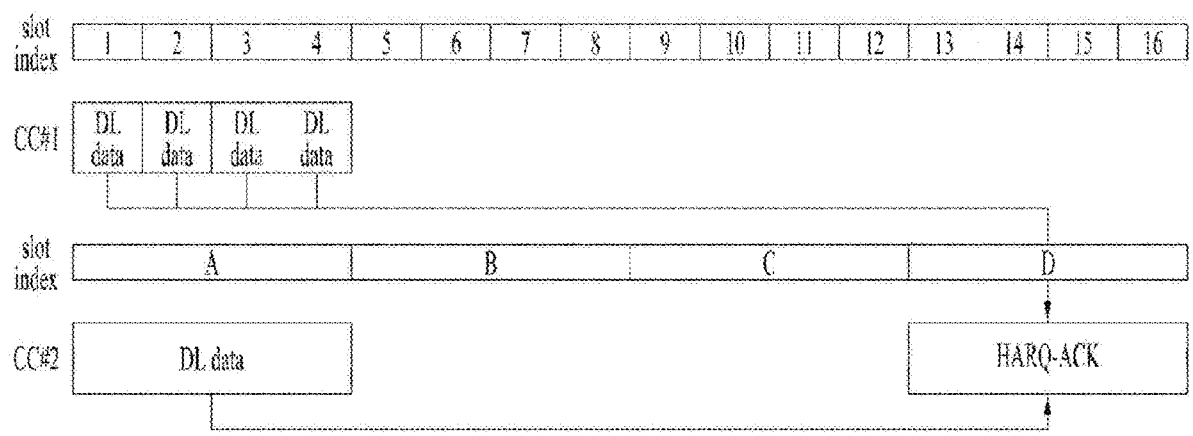
Figure 11:
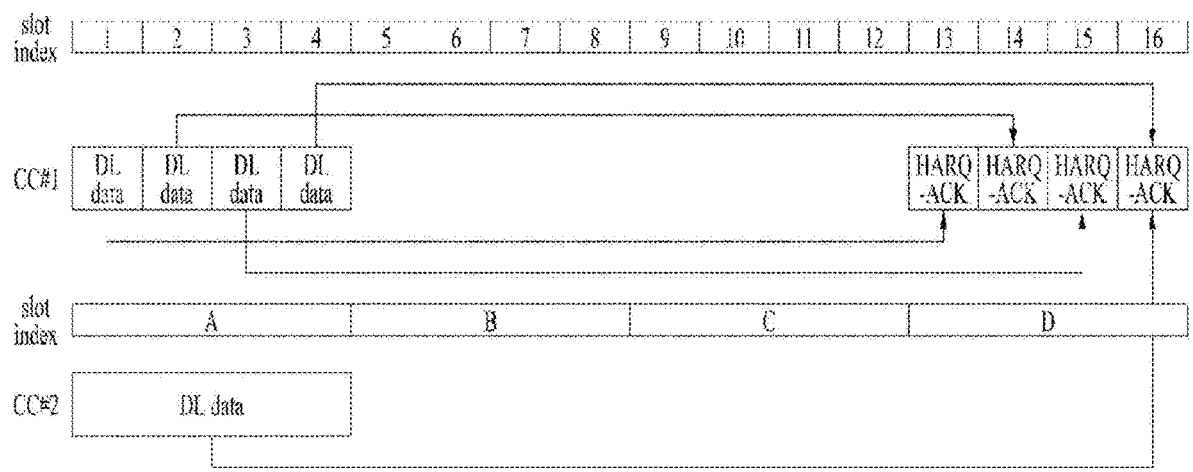

Meanwhile, as shown in FIG. 10 and FIG. 11, CCs may differ from each other in numerology (e.g., SCS) or Transmit Time Interval (TTI). Specifically, FIG. 10 shows a case that TTI of slot length of DL data received on CC #1 is relatively short in comparison to CC #2 and that HARQ-ACK is transmitted on CC #2 supportive of longer TTI or slot length. On the contrary, FIG. 11 shows a case that TTI of slot length of DL data received on CC #2 is relatively long in comparison to CC #1 and that HARQ-ACK is transmitted on CC #1 supportive of shorter TTI or slot length.

Meanwhile, in scheduling DL data of several slots, as shown in FIG. 8, if DL data of each slot is scheduled by individual DL assignment (e.g., DL grant DCI), DCI signaling overhead may occur. For the reduction of such DCI signaling overhead, a method of scheduling a plurality of PDSCHs (or TBs) by single DL assignment may be employed. In this case, each PDSCH (or TB) may be transmitted in unit of subframe, slot or mini-slot. Moreover, as shown in FIG. 10 and FIG. 11, in case of performing cross-carrier scheduling on CC #1 in CC #2 having a relatively small SCS, if four slots of a scheduled cell are scheduled with individual DCIs in a single slot of a scheduling cell, respectively, it is not preferable in aspect of DCI signaling overhead.

In the following description, when one DL assignment schedules a plurality of PDSCHs (or TBs) [for clarity, multi0TTI DL scheduling] and each PDSCH (or TB) is transmitted in unit of subframe, slot or mini-slot, an HARQ-ACK transmitting method corresponding to the corresponding PDSCH(s) is proposed. In the present specification, a slot may be substituted with a subframe of an LTE system (e.g., MTC or NB-IoT). In addition, the proposal of the present specification is applicable even to a case that each PDSCH is transmitted on a different carrier (or cell). For example, when Component Carrier (CC) #1 and CC #2 are carrier-aggregated, one DL assignment transmitted on CC #1 may simultaneously schedule PDSCH on CC #2 as well as PDSCH on CC #1. In the present specification, such DL assignment is defined as multi-CC DCI for clarity. The multi-CC DCI is provided for PDSCH scheduling on a plurality of CCs and may schedule PDSCH on maximum N (>1) CCs. Namely, the number of CCs that can be scheduled by multi-CC DCI ranges 1 to N. The N may be pre-defined or configured by a BS via higher layer (e.g., RRC) signaling. Meanwhile, single-CC DCI in the present specification means DL assignment capable of scheduling PDSCH on a single CC only.

For clarity, although the present specification assumes that both C-DAI and T-DAI are included/configured in DL assignment (e.g., DL grant DCI), T-DAI may not be included/configured in DCI in case of single-cell-only for example.

In the present specification, DL assignment means DL scheduling information/channel. For example, DL assignment may mean DL grant DCI (e.g., DCI format 10, DCI format 11) (see FIG. 5) or PDCCH carrying DL grant DCI. Hereinafter, DCI may mean DL grant DCI unless particularly specified. DL grant DCI may include information for scheduling PDSCH. Moreover, in the present specification, DL data means a DL signal for which HARQ-ACK feedback is required. For example, DL data may include: (i) PDSCH and (ii) PDCCH indicating DL Semi-Persistent Scheduling (SPS) release.

Meanwhile, in the present specification, in indicating HARQ timing in multi-TTI DCI, an HARQ timing may mean an offset value from a reception end timing point (e.g., slot, symbol) of multi-TTI DCI to an end timing point (e.g., ending slot, ending symbol) of a last PDSCH among a plurality of PDSCHs scheduled by the multi-TTI DCI.

For clarity, in the following description, assuming that one TBT transmission is available per PDSCH or that HARQ-ACK bundling is configured between TB(s) of PDSCH, 1-bit HARQ-ACK information per PDSCH is generated/fed back. Yet, if transmission of maximum two TBs per PDSCH is available and HARQ-ACK bundling is not configured between TBs of PDSCH, 2-bit HARQ-ACK information per PDSCH is generated/fed back. HARQ-ACK bundling means an operation of generating 1-bit HARQ-ACK by applying logical AND operation to HARQ-ACK bit corresponding to each TB of PDSCH. The number of TBs transmittable per PDSCH and a presence or non-presence of HARQ-ACK bundling applicability may be configured per cell. Moreover, in the following description, 'scheduling slot #N in slot #T' or 'scheduling data of slot #N in slot #T' means that data of slot #N in slot #T' means that data of slot #N is scheduled based on DCI of slot #T.

1) Receiver (Entity a; e.g., UE): DAI Signaling Method in Case that a Synamic Codebook (e.g., NR Type-2 HARQ-ACK Codebook) is Configured

[Method #1] Increasing DAI Value in Unit of DL Assignment

Figure 12:
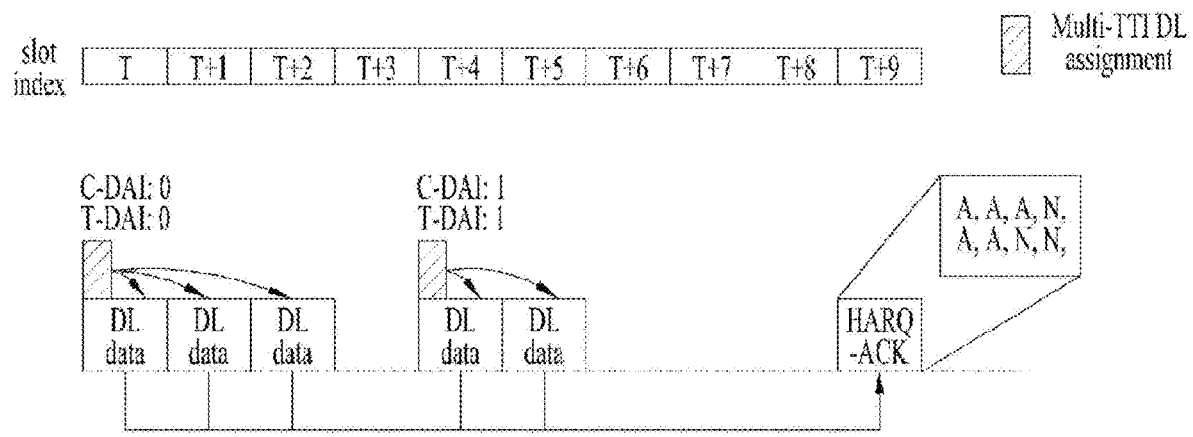
FIGS. 12 to 20 illustrate data scheduling and HARQ-ACK feedback according to the present disclosure.

As shown in FIG. 12, C-DAI and T-DAI may increase by 1 for each (multi-TTI DL) DCI. In this case, an HARQ-ACK codebook size may be determined based on the maximum number N of PDSCHs (or slots, or TBs, or mini-slots) that can be scheduled by multi-TTI DCI. Here, the N value may be predefined (e.g., if SCS of a scheduling cell is SC1 and SCS of a scheduled cell is SC2 ($\geq$SC1), the N value is determined equal to or smaller than SC2/SC1) or configured by higher layer (e.g., RRC) signaling. Since a T-DAI value of a last multi-TTI DL assignment is 1 in FIG. 12, an (2*N)-bit HARQ-ACK codebook may be configured. Meanwhile, regarding N-bit HARQ-ACK corresponding to each DAI value, if the number of actually scheduled PDSCHs is K ($\leq$N), HARQ-ACK information corresponding to a scheduled PDSCH is carried on first (i.e., MSB) L bits among N bits and NACK information may be carried on the rest of (i.e., LSB) (N-K) bit(s). If the N value is equal to the maximum HARQ process ID number configured for the corresponding cell, N-bit HARQ-ACK corresponding to each DAI value may be configured as a bitmap corresponding to HARQ process index. Namely, each bit of the N-bit HARQ-ACK may indicate HARQ-ACK information on the corresponding HARQ process ID. In this case, with respect to N-bit HARQ-ACK, if the number of actually scheduled PDSCHs is K ($\leq$N), corresponding HARQ-ACK information may be carried not on the first K bits but on K bits corresponding to the actually scheduled HARQ process ID and NACK information may be carried on the rest of (N-K) bit(s).

Figure 13:
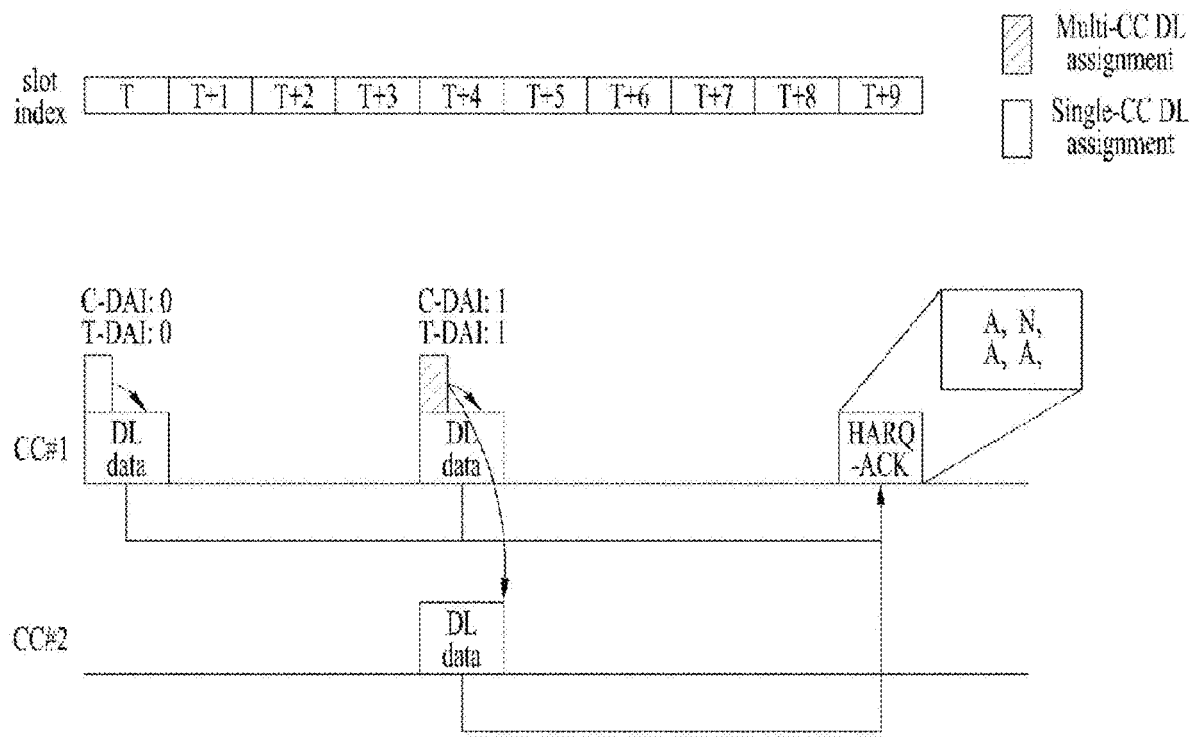

As shown in FIG. 13, C-DAI and T-DAI may increase by 1 for each (single-CC or multi-CC DL) DCI. In this case, an HARQ-ACK codebook size may be determined based on the maximum number N of CCs that can be scheduled by a corresponding DCI. Here, the N value may be predefined or configured by higher layer (e.g., RRC) signaling. Since a T-DAI value is 1 in FIG. 13, an (2*N)-bit HARQ-ACK codebook may be configured. Meanwhile, regarding N-bit HARQ-ACK corresponding to each DAI value, if the number of actually scheduled CCs is K (<N), HARQ-ACK information (e.g., '1' in case of ACK or '0' in case of NACK) corresponding to PDSCH on scheduled CC(s) is carried on first (i.e., MSB) K bits among N bits and NACK information (e.g., '0') may be carried on the rest of (i.e., LSB) (N-K) bit(s). If the N value is equal to the maximum HARQ process ID number configured for the corresponding cell, N-bit HARQ-ACK corresponding to each DAI value may be configured as a bitmap corresponding to HARQ process index. Namely, each bit of the N-bit HARQ-ACK may indicate HARQ-ACK information on the corresponding HARQ process ID. In this case, with respect to N-bit HARQ-ACK, if the number of actually scheduled PDSCHs is K ($\leq$N), corresponding HARQ-ACK information may be carried not on the first K bits but on K bits corresponding to the actually scheduled HARQ process ID and NACK information may be carried on the rest of (N-K) bit(s).

Figure 14:
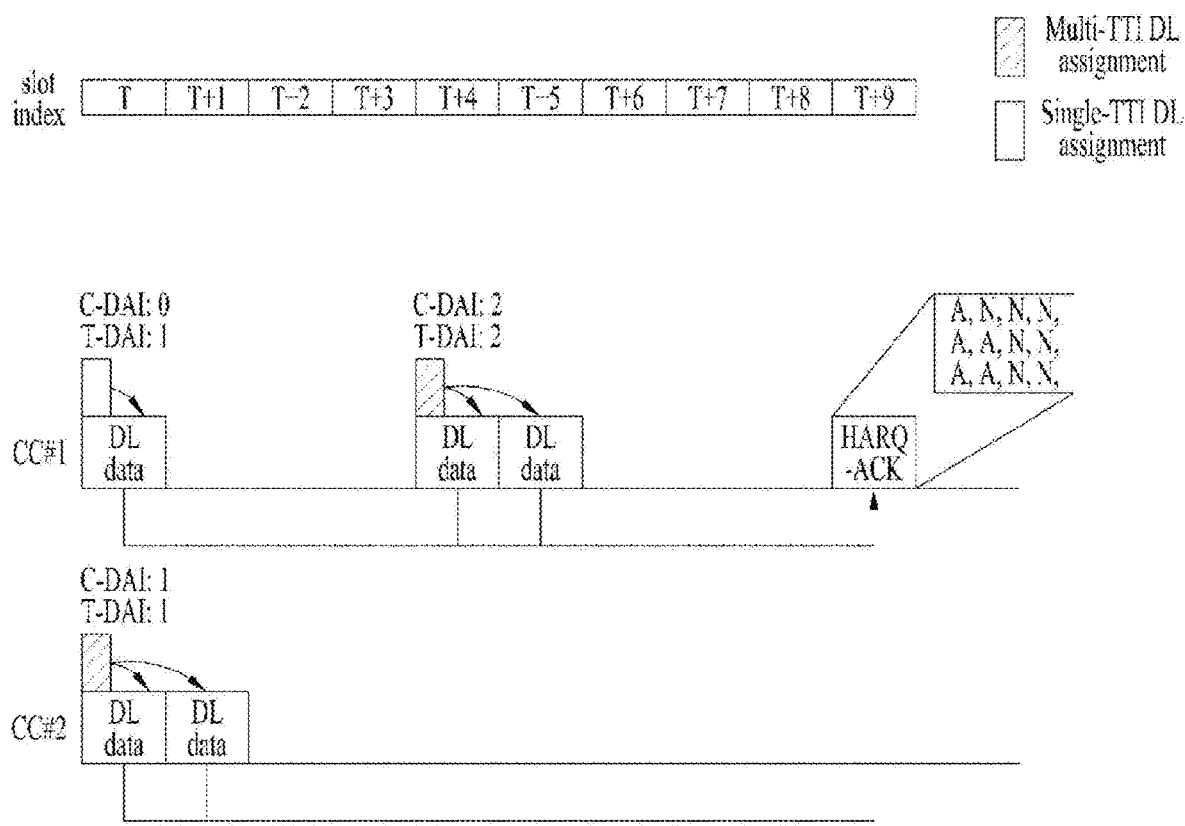

In addition, as shown in FIG. 14, the same HARQ-ACK codebook may be also configured with HARQ-ACK informations on a plurality of PDSCHs scheduled by multi-TTI DL assignment and one PDSCH scheduled by single-TTI DL assignment on a single CC. Moreover, the same HARQ-ACK codebook may be configured with HARQ-ACK informations on PDSCHs on different CCs. In doing so, the maximum number N Of PDSCHs (or slots, TBs, mini-slots) that can be scheduled by multi-TTI DCI may be configured different per CC (or BWP). Hence, an HARQ-ACK codebook size may be determined based on a maximum value among the configured per-CC (or -BWP) N values. If CBG is configured on a specific CC (or BWP), a HARQ-ACK codebook size may be determined based on a maximum value among the per-CC (or -BWP) N*CBG number values. In FIG. 14, if the N value configured for CC #1 is 4 and the N value configured for CC #2 is 2, a T-DAI value is 2. Hence, an HARQ-ACK codebook in size of 4 (=a maximum value among the N values configured for CC #1 and CC #2)*3 bits may be configured.

Alternatively, a rule may be provided in a manner that even in a single CC, a plurality of PDSCHs scheduled by multi-TTI DL assignment and one PDSCH scheduled by single-TTI DL assignment (e.g., DCI format 1_0: a case that one PDSCH is actually scheduled by multi-TTI DL assignment) configure separate (sub-)codebooks. For example, in 2-CC CA situation, if multi-TTI DCI is configured in PDSCH scheduling on CC #1 only, a sub-codebook #1 may be configured only with HARQ-ACK information corresponding to PDSCHs scheduled by the multi-TTI DCI scheduling the PDSCH on CC #1 and a sub-codebook #2 may be configured only with HARQ-ACK information corresponding to PDSCH scheduled by the single-TTI DL DCI scheduling the PDSCH on CC #1 and PDSCHs scheduled by DL assignment scheduling the PDSCH on CC #2. Thereafter, a UE may configure the sub-codebook #1 and the sub-codebook #2 into a single codebook and then transmit the single codebook. Here, 'configuring different codebooks' may mean that a DAI value counting (or indexing) method is performed per sub-codebook.

Figure 15:
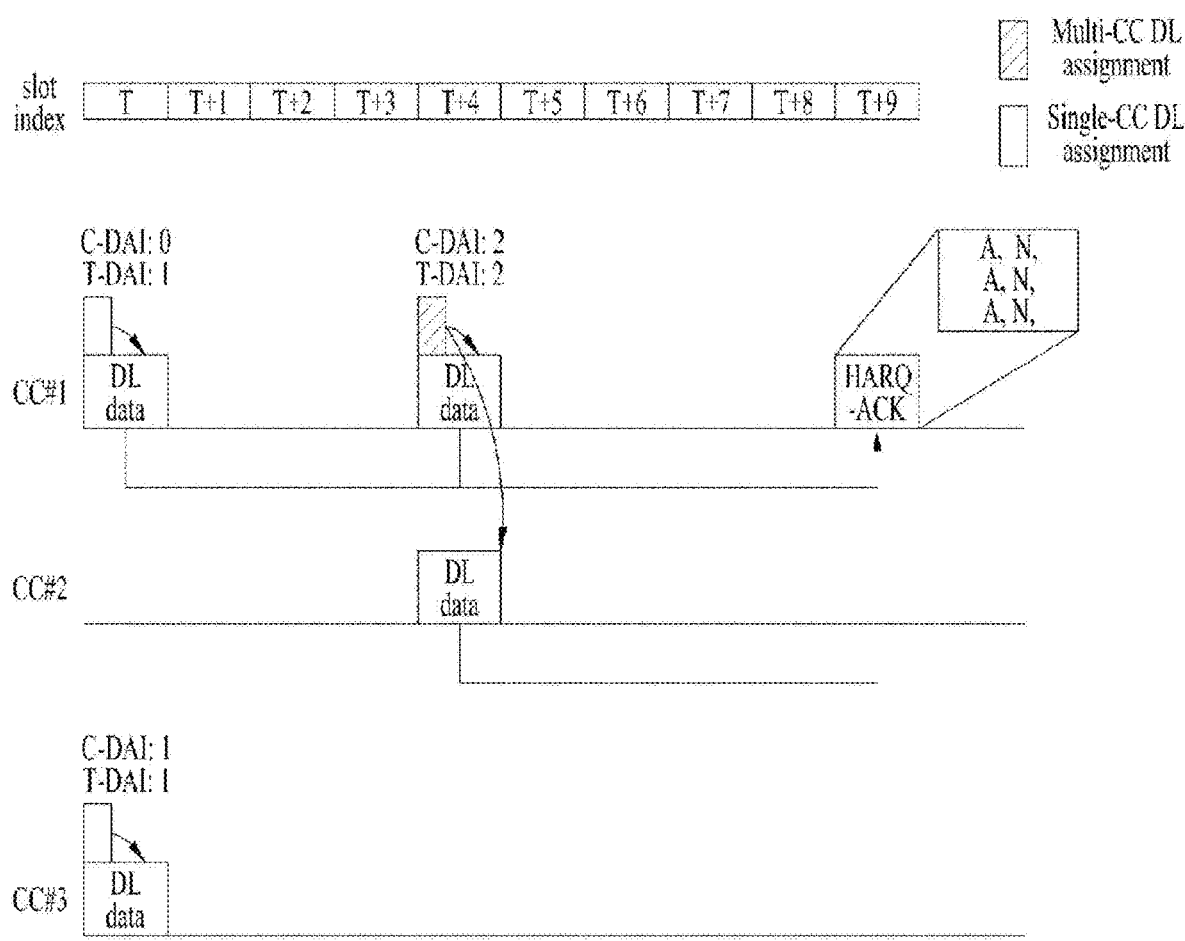

In addition, as shown in FIG. 15, the same HARQ-ACK codebook may be also configured with HARQ-ACK information on a plurality of PDSCHs scheduled by multi-CC DL assignment and HARQ-ACK informations on one PDSCH scheduled by single-CC DL assignment on a single CC. Moreover, the same HARQ-ACK codebook may be configured with HARQ-ACK informations on PDSCHs on different CCs. In doing so, the maximum number N Of CCs that can be scheduled by multi-CC DCI may be configured different per CC (or BWP). Hence, an HARQ-ACK codebook size may be determined based on a maximum value among the configured per-CC (or -BWP) N values. If CBG is configured on a specific CC (or BWP), an HARQ-ACK codebook size may be determined by a maximum value among the per-CC (or -BWP) N*CBG number values. In FIG. 15, if the N value configured for CC #1 is 2 and the N value configured for CC #3 is 1, a T-DAI value is 2. Hence, an HARQ-ACK codebook in size of 2 (=a maximum value among the N values configured for CC #1 and CC #3)*3 bits may be configured.

Alternatively, a rule may be provided in a manner that even in a single CC, a plurality of PDSCHs scheduled by multi-TTI DL assignment and one PDSCH scheduled by single-TTI DL assignment (e.g., fallback DCI (e.g., DCI format 10): a case that one PDSCH is scheduled only by multi-TTI DL assignment) configure separate (sub-)codebooks. For example, in 3-CC CA situation, if multi-CC DCI is configured in PDSCH scheduling on CC #1 only, a sub-codebook #1 may be configured only with HARQ-ACK information corresponding to PDSCHs scheduled by the multi-CC DCI scheduling the PDSCH on CC #1 and a sub-codebook #2 may be configured only with HARQ-ACK information corresponding to PDSCH scheduled by single-CC DL DCI scheduling the PDSCH on CC #1 and PDSCHs scheduled by DL assignment scheduling CC #3 PDSCH. The sub-codebook #1 and the sub-codebook #2 may be configured into a single codebook and then transmitted. Here, 'configuring different codebooks' may mean that a DAI value counting (or indexing) method is performed per sub-codebook.

Figure 16:
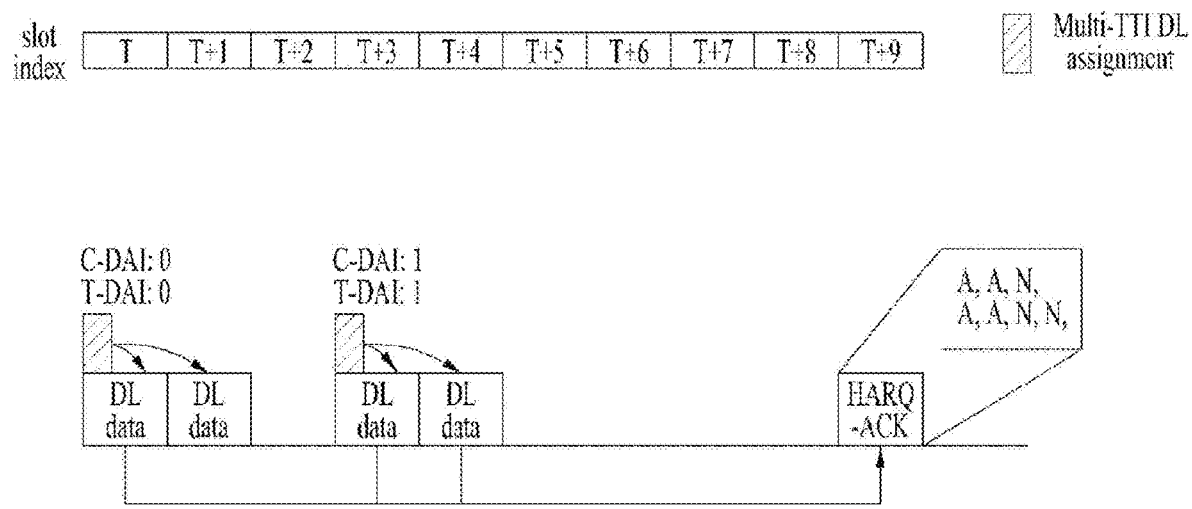

Additionally, although the maximum number N of PDSCHs (or slots, TBs, mini-slots) that can be scheduled by multi-TTI DCI is configured already, PDSCHs of which number is smaller than N may be scheduled via multi-TTI DCI only. In doing so, a slot that can be scheduled by multi-TTI DCI is scheduled by a separate DCI, and HARQ-ACK timings corresponding to the PDSCHs scheduled by the two DCIs may be identical to each other. In this case, in response to C-DAI, HARQ-ACK transmission in size smaller than N bits may be allowed. For example, when it is set to N=4, as shown in FIG. 16, a slot set that can be scheduled by multi-TTI DCI of slot #T includes {slot #T, slot #T+1, slot T+2, slot #T+3}, and PDSCH may be scheduled in slot #T+3 via separate DCI. In this case, in order to reduce redundancy of HARQ-ACK information corresponding to the slot #T+3, an HARQ-ACK codebook corresponding to 'C-DAI=0' may be configured with 3 bits and an HARQ-ACK codebook corresponding to 'C-DAI=1' may be configured with 4 bits. In addition, some of slots (or mini-slots) that can be scheduled by multi-TTI DCI may have difficulty in HARQ-ACK transmission due to the processing time margin shortage at an indicated HARQ-ACK transmission timing. In this case, HARQ-ACK information corresponding to the corresponding slot (or mini-slot) may be excluded from the codebook configuration. For example, a slot set that can be scheduled by multi-TTI DCI of slot #T+3 includes {slot #T+3, slot #T+4, slot #T+5, slot #T+6}, and an HARQ-ACK transmission timing may be indicated as slot #T+9. In this case, due to UE processing time capability, if it is impossible to transmit HARQ-ACK corresponding to PDSCH after the slot #T+5, an HARQ-ACK codebook corresponding to 'C-DAI=1' may be configured with 2 bits only (except HARQ-ACK information corresponding to slot #T+5/slot #T+6).

[Method #2] Increasing DAI Value in PDSCH (or TB) Unit

As [Method #1] determines an HARQ-ACK size corresponding to C-DAI as N value (or maximum value among per-cell N values), HARQ-ACK informations more than the number of actually scheduled PDSCHs may be fed back. To solve this, a DAI value may be increased by 1 per PDSCH unit. Or, a DAI value may be increased by 1 per the number of CCs scheduled by multi-CC DL assignment.

Figure 17:
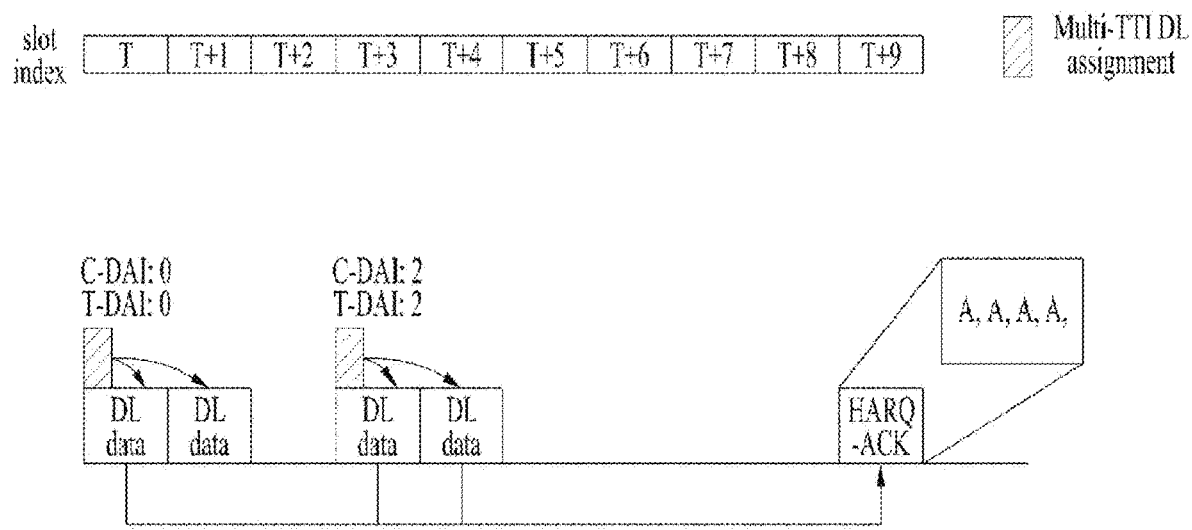

For example, as shown in FIG. 17, a DAI value may be increased per PDSCH. Since total four PDSCHs are scheduled, 4-bit HARQ-ACK information may be fed back. In this case, although values of C-DAI and T-DAI are counted with reference to a DCI transmission slot in the example of FIG. 17, a value of C-DAI and/or T-DAU may be counted with reference to a slot (or mini-slot) of a latest timing among PDSCH(s) scheduled by DCI. In this case, referring to FIG. 17, C-DAI=0/T-DAI=1 may be signaled in slot #T and C-DAI=2/T-DAI=3 may be signaled in slot #T+3.

Figure 18:
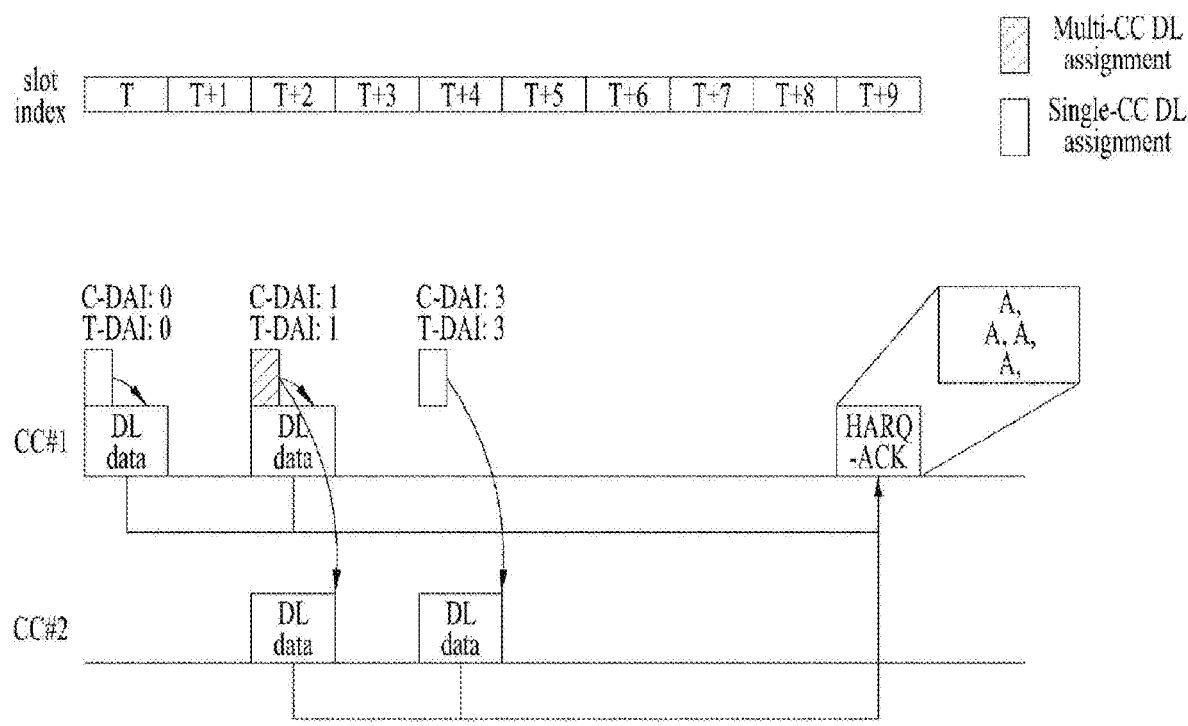

As shown in FIG. 18, a DAI value may increase per CC. Since PDSCH is scheduled on total four CCs (two CC #1 and two CC #w), 4-bit HARQ-ACK information may be fed back. In this case, although both of the C-DAI value and the T-DAI value are counted with reference to a DAI value in scheduling DCI transmission CC, the C-DAI value and/or the T-DAI value may count a DAI value with reference to a specific CC (e.g., a biggest CC index or a smallest CC index) among CC(s) scheduled in DCI. For example, if a DAI value is counted based on CC #2 in a scheduling DCI transmission slot, C-DAI and T-DAI of multi-CC DCI may be signaled as C-DAI=2 and T-DAI=2 in slot #2+2.

Meanwhile, in the legacy NR, each DAI field is limited to 2 bits in consideration of a DCI missing case. Yet, if a multitude of PDSCHs can be scheduled in each DCI, DAI may be more affected by the DCI missing case. Considering this, a DAI field size of multi-TTI (or multi-CC) DCI may be increased more than the existing size (e.g., 2 bits). For example, a DAI field size of multi-TTI (or multi-CC) DCI may be determined as '2+ceiling{log$_2$(maximum value among N values per CC (or BWP) configured within the cell group)}'. Here, ceiling {X} means a smallest integer value among integers equal to or greater than X. Thus, Opt 1) the size-increased DAI field is applied to multi-TTI (or multi-CC) DL assignment only but is not applied to single-TTI (or single-CC) DL assignment (e.g., fallback DCI (e.g., DCI format 1_0): a case of actually scheduling one PDSCH only by multi-TTI (or multi-CC) DL assignment), or Opt 2) the size-increased DAI field is commonly applicable not only to multi-TTI (or multi-CC) DL assignment but also to single-TTI (or single-CC) DL assignment (e.g., fallback DCI (e.g., DCI format 1_0): a case of actually scheduling one PDSCH only by multi-TTI (or multi-CC) DL assignment). In case of Opt 1), a rule may be provided in a manner that HARQ-ACK information on a plurality of PDSCHs scheduled by multi-TTI (or multi-CC) DL assignment and one PDSCH scheduled by single-TTI DL assignment (e.g., e.g., fallback DCI (e.g., DCI format 1_0): a case of actually scheduling one PDSCH only by multi-TTI (or multi-CC) DL assignment) in a single CC (or slot) is configured as separate (sub-)codebooks. In case of Opt 2), a rule may be provided in a manner that a plurality of PDSCHs scheduled by multi-TTI (or multi-CC) DL assignment and one PDSCH scheduled by single-TTI (or single-CC) DL assignment (e.g., fallback DCI (e.g., DCI format 1_0): a case of actually scheduling one PDSCH only by multi-TTI (or multi-CC) DL assignment) in a single CC (or slot) are configured as a single codebook.

Meanwhile, HARQ-ACK information corresponding to a plurality of PDSCHs scheduled by one multi-TTI DCI may be transmitted not on a single UL channel (e.g., PUCCH, PUSCH) but on a plurality of UL channels. For example, if an HARQ-ACK transmission timing is predefined or preconfigured per PDSCH similarly to an LTE TDD system, a (partial) UL slot may be located between DL slots (or subframes), and HARQ-ACK information corresponding to some PDSCH(s) among a plurality of PDSCHs scheduled by one multi-TTI DCI may be fed back in the corresponding UL slot. Considering that there is no mismatch in a HARQ-ACK codebook size only if DAI corresponding to a different HARQ-ACK feedback occasion is counted separately, if HARQ-ACK information corresponding to some of a plurality of PDSCHs scheduled by one multi-TTI DCI is fed back first, it is proposed that DAI for the rest of the PDSCHs should be counted again by starting with 0.

Figure 19:
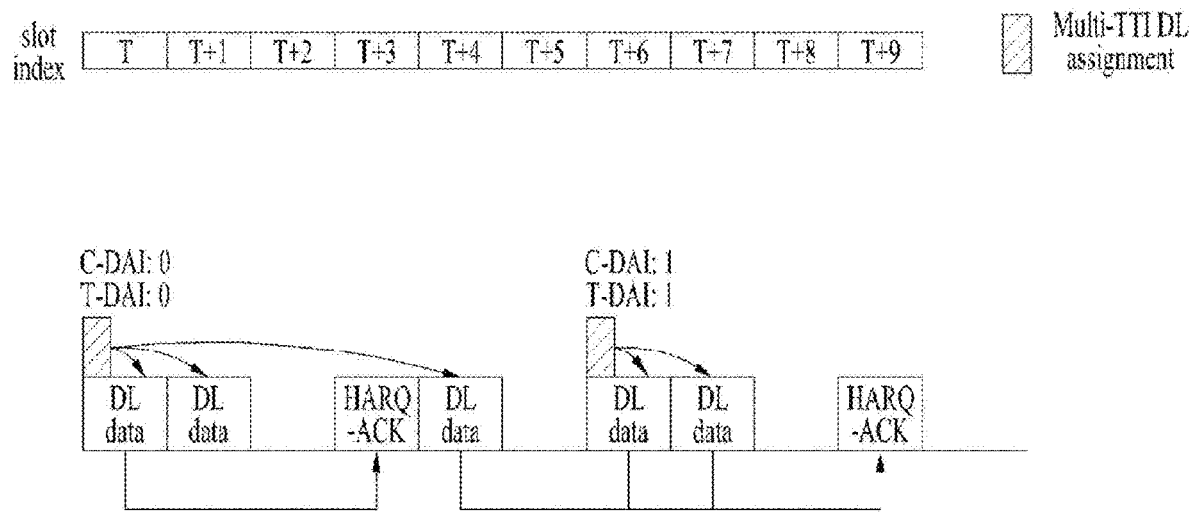
Figure 20:
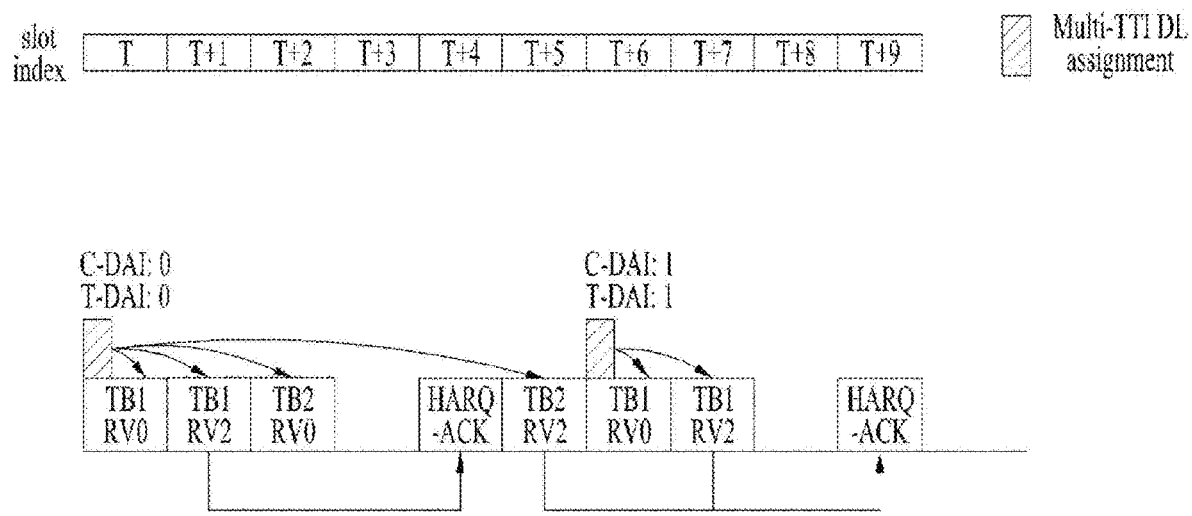

For example, as shown in FIG. 19, although PDSCHs of three slots (e.g., slot #T, slot #T+1, slot #T+4) are scheduled in slot #T, HARQ-ACK corresponding to PDSCHs of slots #T and #T+1 may be preferentially fed back in slot #T+3. In doing so, a UE may recognize C-DAI corresponding to PDSCH of slot #T+4 not as 2 but as 0. Hence, a BS may signal '1', which is a next C-DAI value, in a following DL assignment, i.e., multi-TTI DCI that schedules PDSCH of slot #T+6. Alternatively, when a (partial) UL slot may be located between DL slots (or subframes), in order to prevent occurrence of a case that a plurality of PDSCHs scheduled by one multi-TTI DCI fail to be contiguous on time due to the corresponding UL slot, the maximum number of PDSCHs that can be scheduled by the multi-TTI DCI may be limited to the maximum number of DL slots capable of being contiguous in the corresponding cell. For example, the maximum number of PFSCHs that can be scheduled by multi-TTI DCI may be limited by the number of DL subframes contiguous per DL/UL configuration in LTE TDD system. Moreover, in scheduling a multitude of TBs in multi-TTI DCI, one TB may be scheduled to be repeatedly transmitted in a multitude of slots (or subframes, mini-slots) (or, transmitted in a manner of changing a Redundancy Version (RV) additionally). In doing so, PDSCHs on a multitude of slots (or subframes, mini-slots) corresponding to the same TB are assumed as having a single DAI value, and the same rule as FIG. 19 may apply thereto. For example, as shown in FIG. 20, when two TBs are scheduled in slot #T and each TB is transmitted in a manner of changing an RV value across two slots, a UE may recognize C-DAI corresponding to PDSCH of slot #T+5 not as 1 but as 0. Therefore, a BS may signal 1, which is a next C-DAI value, in a following DL assignment, i.e., multi-TTI DCI that schedules PDSCH of slot #T+6.

In addition, if DCI and PDSCH fail to exist in slot #T+6 and slot #T+7, a UE may feedback HARQ-ACK information corresponding to PDSCH of slot #T+4 in slot #T+9. In doing so, a resource used to feed back the HARQ-ACK information in the slot #T+9 may be signaled by DCI of slot #T, which scheduled PDSCH of the slot #T+9. Namely, in transmitting HARQ-ACK information corresponding to a plurality of PDSCHs scheduled by the DCI of the slot #T in slot #T+3 and slot #T+9, a resource used to transmit HARQ-ACK information in each slot may be signaled by the DCI of the slot #T. For example, resource candidates for HARQ-ACK feedback are configured via RRC signaling, and one of the resource candidates may be indicated via multi-TTI DCI. Here, the resource candidate may include a PUCCH resource candidate. In this case, the resource indicated via the multi-TTI DCI may commonly apply to slot #T+3 and slot #T+9. Or, in configuring resource candidates for HARQ-ACK feedback via RRC signaling, resource candidate groups are configured and one of the resource candidate groups may be indicated via multi-TTI DCI. Here, the resource candidate group includes a resource candidate of each slot. For example, one resource candidate group may be configured with a resource A in a first slot and a resource B in a second slot.

2) Transmitter (Entity B: e.g., BS): DAI Signaling Method when a Dynamic Codebook (e.g., Type-2 HARQ-ACK Codebook in NR System) is Configured

[Method #1A] Increasing DAI Value in DL Assignment Unit

As shown in FIG. 12, C-DAI and T-DAI may increase by 1 for each (multi-TTI DL) DCI. In this case, an HARQ-ACK codebook size may be determined based on the maximum number N of PDSCHs (or slots, or TBs, or mini-slots) that can be scheduled by multi-TTI DCI. Here, the N value may be predefined (e.g., if SCS of a scheduling cell is SC1 and SCS of a scheduled cell is SC2 (≥SC1), the N value is determined equal to or smaller than SC2/SC1) or configured by higher layer (e.g., RRC) signaling. Since a T-DAI value of a last multi-TTI DL assignment is 1 in FIG. 12, an (2*N)-bit HARQ-ACK codebook may be configured. Meanwhile, regarding N-bit HARQ-ACK corresponding to each DAI value, if the number of actually scheduled PDSCHs is K (<N), HARQ-ACK information corresponding to a scheduled PDSCH is carried on first (i.e., MSB) L bits among N bits and NACK information may be carried on the rest of (i.e., LSB) (N-K) bit(s). If the N value is equal to the maximum HARQ process ID number configured for the corresponding cell, N-bit HARQ-ACK corresponding to each DAI value may be configured as a bitmap corresponding to HARQ process index. Namely, each bit of the N-bit HARQ-ACK may indicate HARQ-ACK information on the corresponding HARQ process ID. In this case, with respect to N-bit HARQ-ACK, if the number of actually scheduled PDSCHs is K (≤N), corresponding HARQ-ACK information may be carried not on the first K bits but on K bits corresponding to the actually scheduled HARQ process ID and NACK information may be carried on the rest of (N-K) bit(s).

As shown in FIG. 13, C-DAI and T-DAI may increase by 1 for each (single-CC or multi-CC DL) DCI. In this case, an HARQ-ACK codebook size may be determined based on the maximum number N of CCs that can be scheduled by a corresponding DCI. Here, the N value may be predefined or configured by higher layer (e.g., RRC) signaling. Since a T-DAI value is 1 in FIG. 13, a BS may expect that an (2*N)-bit HARQ-ACK codebook is configured and fed back. Meanwhile, regarding N-bit HARQ-ACK corresponding to each DAI value, if the number of actually scheduled CCs is K (<N), HARQ-ACK information (e.g., '1' in case of ACK or '0' in case of NACK) corresponding to PDSCH on scheduled CC(s) is carried on first (i.e., MSB) K bits among N bits and NACK information (e.g., '0') may be carried on the rest of (i.e., LSB) (N-K) bit(s). If the N value is equal to the maximum HARQ process ID number configured for the corresponding cell, N-bit HARQ-ACK corresponding to each DAI value may be configured as a bitmap corresponding to HARQ process index. Namely, each bit of the N-bit HARQ-ACK may indicate HARQ-ACK information on the corresponding HARQ process ID. In this case, with respect to N-bit HARQ-ACK, if the number of actually scheduled PDSCHs is K (≤N), corresponding HARQ-ACK information may be carried not on the first K bits but on K bits corresponding to the actually scheduled HARQ process ID and NACK information may be carried on the rest of (N-K) bit(s).

In addition, as shown in FIG. 14, the same HARQ-ACK codebook may be also configured with HARQ-ACK informations on a plurality of PDSCHs scheduled by multi-TTI DL assignment and one PDSCH scheduled by single-TTI DL assignment on a single CC. Moreover, the same HARQ-ACK codebook may be configured with HARQ-ACK informations on PDSCHs on different CCs. In doing so, the maximum number N Of PDSCHs (or slots, TBs, mini-slots) that can be scheduled by multi-TTI DCI may be configured different per CC (or BWP). Hence, an HARQ-ACK codebook size may be determined based on a maximum value among the configured per-CC (or -BWP) N values. If CBG is configured on a specific CC (or BWP), a HARQ-ACK codebook size may be determined based on a maximum value among the per-CC (or -BWP) N*CBG number values. In FIG. 14, if the N value configured for CC #1 is 4 and the N value configured for CC #2 is 2, a T-DAI value is 2. Hence, an HARQ-ACK codebook in size of 4 (=a maximum value among the N values configured for CC #1 and CC #2)*3 bits may be configured.

Alternatively, a rule may be provided in a manner that even in a single CC, a plurality of PDSCHs scheduled by multi-TTI DL assignment and one PDSCH scheduled by single-TTI DL assignment (e.g., DCI format 1_0: a case that one PDSCH is actually scheduled by multi-TTI DL assignment) configure separate (sub-)codebooks. For example, in 2-CC CA situation, if multi-TTI DCI is configured in PDSCH scheduling on CC #1 only, a sub-codebook #1 may be configured only with HARQ-ACK information corresponding to PDSCHs scheduled by the multi-TTI DCI scheduling the PDSCH on CC #1 and a sub-codebook #2 may be configured only with HARQ-ACK information corresponding to PDSCH scheduled by the single-TTI DL DCI scheduling the PDSCH on CC #1 and PDSCHs scheduled by DL assignment scheduling the PDSCH on CC #2. A BS may expect that the sub-codebook #1 and the sub-codebook #2 are configured into a single codebook and then fed back. Here, counting (or indexing) for a DAI value may be performed per sub-codebook.

In addition, as shown in FIG. 15, the same HARQ-ACK codebook may be also configured with HARQ-ACK information on a plurality of PDSCHs scheduled by multi-CC DL assignment and HARQ-ACK informations on one PDSCH scheduled by single-CC DL assignment on a single CC. Moreover, the same HARQ-ACK codebook may be configured with HARQ-ACK informations on PDSCHs on different CCs. In doing so, the maximum number N Of CCs that can be scheduled by multi-CC DCI may be configured different per CC (or BWP). Hence, an HARQ-ACK codebook size may be determined based on a maximum value among the configured per-CC (or -BWP) N values. If CBG is configured on a specific CC (or BWP), an HARQ-ACK codebook size may be determined by a maximum value among the per-CC (or -BWP) N*CBG number values. In FIG. 15, if the N value configured for CC #1 is 2 and the N value configured for CC #3 is 1, a T-DAI value is 2. Hence, a BS may expect that an HARQ-ACK codebook in size of 2 (=a maximum value among the N values configured for CC #1 and CC #3)*3 bits is configured and fed back.

Alternatively, a rule may be provided in a manner that even in a single CC, a plurality of PDSCHs scheduled by multi-TTI DL assignment and one PDSCH scheduled by single-TTI DL assignment (e.g., fallback DCI (e.g., DCI format 10): a case that one PDSCH is scheduled only by multi-TTI DL assignment) configure separate (sub-)codebooks. For example, in 3-CC CA situation, if multi-CC DCI is configured in PDSCH scheduling on CC #1 only, a sub-codebook #1 may be configured only with HARQ-ACK information corresponding to PDSCHs scheduled by the multi-CC DCI scheduling the PDSCH on CC #1 and a sub-codebook #2 may be configured only with HARQ-ACK information corresponding to PDSCH scheduled by single-CC DL DCI scheduling the PDSCH on CC #1 and PDSCHs scheduled by DL assignment scheduling CC #3 PDSCH. A BS may expect that the sub-codebook #1 and the sub-codebook #2 are configured into a single codebook and then fed back. Here, counting (or indexing) for a DAI value may be performed per sub-codebook.

Additionally, although the maximum number N of PDSCHs (or slots, TBs, mini-slots) that can be scheduled by multi-TTI DCI is configured already, PDSCHs of which number is smaller than N may be scheduled via multi-TTI DCI only. In doing so, a slot that can be scheduled by multi-TTI DCI is scheduled by a separate DCI, and HARQ-ACK timings corresponding to the PDSCHs scheduled by the two DCIs may be identical to each other. In this case, in response to C-DAI, HARQ-ACK transmission in size smaller than N bits may be allowed. For example, when it is set to N=4, as shown in FIG. 16, a slot set that can be scheduled by multi-TTI DCI of slot #T includes {slot #T, slot #T+1, slot T+2, slot #T+3}, and PDSCH may be scheduled in slot #T+3 via separate DCI. In this case, in order to reduce redundancy of HARQ-ACK information corresponding to the slot #T+3, an HARQ-ACK codebook corresponding to 'C-DAI=0' may be configured with 3 bits and an HARQ-ACK codebook corresponding to 'C-DAI=1' may be configured with 4 bits. In addition, some of slots (or mini-slots) that can be scheduled by multi-TTI DCI may have difficulty in HARQ-ACK transmission due to the processing time margin shortage at an indicated HARQ-ACK transmission timing. In this case, HARQ-ACK information corresponding to the corresponding slot (or mini-slot) may be excluded from the codebook configuration. For example, a slot set that can be scheduled by multi-TTI DCI of slot #T+3 includes {slot #T+3, slot #T+4, slot #T+5, slot #T+6}, and an HARQ-ACK transmission timing may be indicated as slot #T+9. In this case, due to UE processing time capability, if it is impossible to transmit HARQ-ACK corresponding to PDSCH after the slot #T+5, a BS may expect that an HARQ-ACK codebook corresponding to 'C-DAI=1' is configured with 2 bits only (except HARQ-ACK information corresponding to slot #T+5/slot #T+6).

[Method #2A] Increasing DAI Value in PDSCH (or TB) Unit

As [Method #1A] determines an HARQ-ACK size corresponding to C-DAI as N value (or maximum value among per-cell N values), HARQ-ACK informations more than the number of actually scheduled PDSCHs may be fed back. To solve this, a DAI value may be increased by 1 per PDSCH unit. Or, a DAI value may be increased by 1 per the number of CCs scheduled by multi-CC DL assignment.

For example, as shown in FIG. 17, a DAI value may be increased per PDSCH. Since total four PDSCHs are scheduled, a BS may expect that 4-bit HARQ-ACK information is fed back. In this case, although values of C-DAI and T-DAI are counted with reference to a DCI transmission slot in the example of FIG. 17, a value of C-DAI and/or T-DAU may be counted with reference to a slot (or mini-slot) of a latest timing among PDSCH(s) scheduled by DCI. In this case, referring to FIG. 17, C-DAI=0/T-DAI=1 may be signaled in slot #T and C-DAI=2/T-DAI=3 may be signaled in slot #T+3.

As shown in FIG. 18, a DAI value may increase per CC. Since PDSCH is scheduled on total four CCs (two CC #1 and two CC #w), a BS may expect that 4-bit HARQ-ACK information is fed back. In this case, although both of the C-DAI value and the T-DAI value are counted with reference to a DAI value in scheduling DCI transmission CC, the C-DAI value and/or the T-DAI value may count a DAI value with reference to a specific CC (e.g., a biggest CC index or a smallest CC index) among CC(s) scheduled in DCI. For example, if a DAI value is counted based on CC #2 in a scheduling DCI transmission slot, C-DAI and T-DAI of multi-CC DCI may be signaled as C-DAI=2 and T-DAI=2 in slot #2+2.

Meanwhile, in the legacy NR, each DAI field is limited to 2 bits in consideration of a DCI missing case. Yet, if a multitude of PDSCHs can be scheduled in each DCI, DAI may be more affected by the DCI missing case. Considering this, a DAI field size of multi-TTI (or multi-CC) DCI may be increased more than the existing size (e.g., 2 bits). For example, a DAI field size of multi-TTI (or multi-CC) DCI may be determined as '2+ceiling{log 2(maximum value among N values per CC (or BWP) configured within the cell group)}'. Here, ceiling {X} means a smallest integer value among integers equal to or greater than X. Thus, Opt 1) the size-increased DAI field is applied to multi-TTI (or multi-CC) DL assignment only but is not applied to single-TTI (or single-CC) DL assignment (e.g., fallback DCI (e.g., DCI format 1_0): a case of actually scheduling one PDSCH only by multi-TTI (or multi-CC) DL assignment), or Opt 2) the size-increased DAI field is commonly applicable not only to multi-TTI (or multi-CC) DL assignment but also to single-TTI (or single-CC) DL assignment (e.g., fallback DCI (e.g., DCI format 1_0): a case of actually scheduling one PDSCH only by multi-TTI (or multi-CC) DL assignment). In case of Opt 1), a BS may expect that HARQ-ACK information on a plurality of PDSCHs scheduled by multi-TTI (or multi-CC) DL assignment and one PDSCH scheduled by single-TTI DL assignment (e.g., e.g., fallback DCI (e.g., DCI format 1_0): a case of actually scheduling one PDSCH only by multi-TTI (or multi-CC) DL assignment) in a single CC (or slot) is configured as separate (sub-)codebooks and then fed back. In case of Opt 2), a BS may expect that a plurality of PDSCHs scheduled by multi-TTI (or multi-CC) DL assignment and one PDSCH scheduled by single-TTI (or single-CC) DL assignment (e.g., fallback DCI (e.g., DCI format 1_0): a case of actually scheduling one PDSCH only by multi-TTI (or multi-CC) DL assignment) in a single CC (or slot) are configured as a single codebook and then fed back.

Meanwhile, HARQ-ACK information corresponding to a plurality of PDSCHs scheduled by one multi-TTI DCI may be received not on a single UL channel (e.g., PUCCH, PUSCH) but on a plurality of UL channels. For example, if an HARQ-ACK transmission timing is predefined or pre-configured per PDSCH similarly to an LTE TDD system, a (partial) UL slot may be located between DL slots (or subframes), and HARQ-ACK information corresponding to some PDSCH(s) among a plurality of PDSCHs scheduled by one multi-TTI DCI may be fed back in the corresponding UL slot. Considering that there is no mismatch in a HARQ-ACK codebook size only if DAI corresponding to a different HARQ-ACK feedback occasion is counted separately, if HARQ-ACK information corresponding to some of a plurality of PDSCHs scheduled by one multi-TTI DCI is fed back first, it is proposed that DAI for the rest of the PDSCHs should be counted again by starting with 0.

For example, as shown in FIG. 19, although PDSCHs of three slots (e.g., slot #T, slot #T+1, slot #T+4) are scheduled in slot #T, HARQ-ACK corresponding to PDSCHs of slots #T and #T+1 may be preferentially fed back in slot #T+3. In doing so, a UE may recognize C-DAI corresponding to PDSCH of slot #T+4 not as 2 but as 0. Hence, a BS may signal '1', which is a next C-DAI value, in a following DL assignment, i.e., multi-TTI DCI that schedules PDSCH of slot #T+6. Alternatively, when a (partial) UL slot may be located between DL slots (or subframes), in order to prevent occurrence of a case that a plurality of PDSCHs scheduled by one multi-TTI DCI fail to be contiguous on time due to the corresponding UL slot, the maximum number of PDSCHs that can be scheduled by the multi-TTI DCI may be limited to the maximum number of DL slots capable of being contiguous in the corresponding cell. For example, the maximum number of PFSCHs that can be scheduled by multi-TTI DCI may be limited by the number of DL subframes contiguous per DL/UL configuration in LTE TDD system. Moreover, in scheduling a multitude of TBs in multi-TTI DCI, one TB may be scheduled to be repeatedly transmitted in a multitude of slots (or subframes, mini-slots) (or, transmitted in a manner of changing a Redundancy Version (RV) additionally). In doing so, PDSCHs on a multitude of slots (or subframes, mini-slots) corresponding to the same TB are assumed as having a single DAI value, and the same rule as FIG. 19 may apply thereto. For example, as shown in FIG. 20, when two TBs are scheduled in slot #T and each TB is transmitted in a manner of changing an RV value across two slots, a UE may recognize C-DAI corresponding to PDSCH of slot #T+5 not as 1 but as 0. Therefore, a BS may signal 1, which is a next C-DAI value, in a following DL assignment, i.e., multi-TTI DCI that schedules PDSCH of slot #T+6.

In addition, if DCI and PDSCH fail to exist in slot #T+6 and slot #T+7, a UE may feedback HARQ-ACK information corresponding to PDSCH of slot #T+4 in slot #T+9. In doing so, a resource used to feed back the HARQ-ACK information in the slot #T+9 may be signaled by DCI of slot #T, which scheduled PDSCH of the slot #T+9. Namely, in receiving HARQ-ACK information corresponding to a plurality of PDSCHs scheduled by the DCI of the slot #T in slot #T+3 and slot #T+9, a resource used to receive HARQ-ACK information in each slot may be signaled by the DCI of the slot #T. For example, resource candidates for HARQ-ACK feedback are configured via RRC signaling, and one of the resource candidates may be indicated via multi-TTI DCI. Here, the resource candidate may include a PUCCH resource candidate. In this case, the resource indicated via the multi-TTI DCI may commonly apply to slot #T+3 and slot #T+9. Or, in configuring resource candidates for HARQ-ACK feedback via RRC signaling, resource candidate groups are configured and one of the resource candidate groups may be indicated via multi-TTI DCI. Here, the resource candidate group includes a resource candidate of each slot. For example, one resource candidate group may be configured with a resource A in a first slot and a resource B in a second slot.

3) Receiver & Transmitter (Between Receiver and Transmitter)

Figure 21:
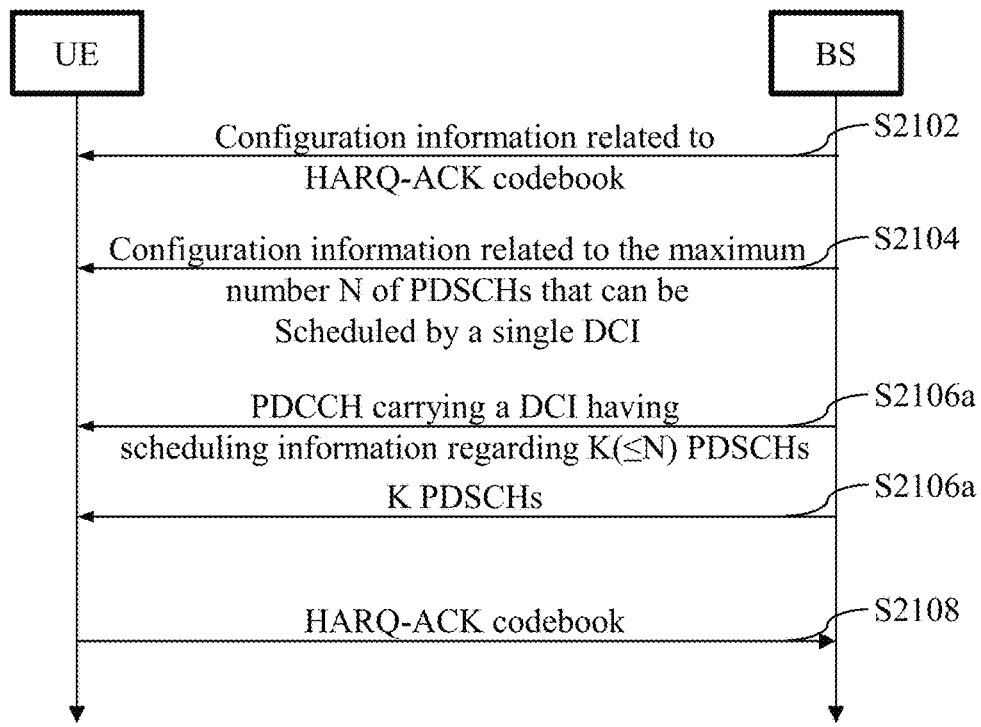
FIG. 21 illustrates an HARQ-ACK feedback process according to the present disclosure.

FIG. 21 illustrates an HARQ-ACK process according to one embodiment of the present disclosure. Referring to FIG. 21, a BS may transmit configuration information related to an HARQ-ACK codebook to a UE [S2102]. For example, the configuration information may include configuration information related to a Type-2 HARQ-ACK codebook. Moreover, the BS may transmit information related to the maximum number N of PDSCHs that can be scheduled by a single DCI (e.g., multi-TTI DCI) to the UE [S2104]. Here, the N value may be set per CC/BWP. The steps S2102 and S2104 may be performed via higher layer signaling (e.g., RRC signaling). Moreover, the step S2102 and the step S2104 may be provided to the UE in time domain simultaneously or separately. Thereafter, the BS may transmit multi-TTI DCI on PDCCH [S2106a]. The multi-TTI DCI includes scheduling information on the maximum of N PDSCHs (e.g., K (<N) PDSCHs). The multi-TTI DCI may include information on HARQ-ACK timing. The multi-TTI DCI includes C-DAI and may further include R-DAI (based on the number of aggregated cells). Thereafter, the BS may transmit the K PDSCH(s) corresponding to the multi-TTI DCI to the UE [S2106b]. Here, the K PDSCH(s) may be transmitted on a plurality of different cells (or CCs) respectively in the same slot or transmitted on the same cell (or CC) in a plurality of different slots respectively. Thereafter, the UE may configure an HARQ-ACK codebook according to [Method #1] and/or [Method #2] in the present specification and feed back HARQ-ACK information to the BS [S2108]. For example, in case of [Method #1], an HARQ-ACK codebook including N HARQ-ACK informations may be fed back in response to the K PDSCH(s) based on the information (e.g., N) of the step S2104. The HARQ-ACK codebook may be transmitted on PUCCH or PUSCH from the UE to the BS.

The aforementioned signal transmitting/receiving operations may identically apply to a licensed band or an unlicensed band. In this case, a communication device (e.g., BS, UE) transmitting a specific signal on an unlicensed band may use/perform a Channel Access Procedure (CAP) to transmit the specific signal. Specifically, in case that a plurality of PDSCHs are transceived on an unlicensed band, a BS may transmit a plurality of PDSCHs to a UE based on CAP for a plurality of PDSCH transmissions. In case that PUCCH including HARQ-ACK information on a plurality of PDSCHs is transceived on an unlicensed band, a UE may transmit the PUCCH to a BS based on CAP for PUCCH transmission.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 22:
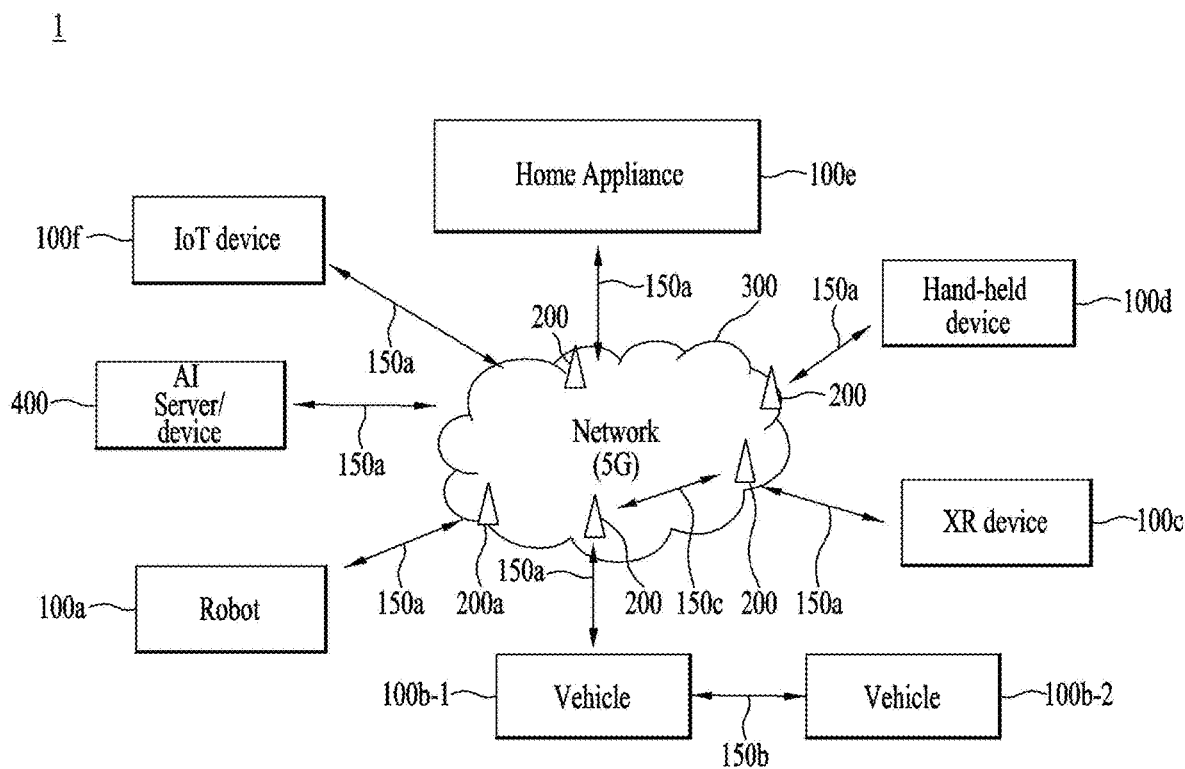
FIGS. 22 to 25 illustrate a communication system 1 and wireless devices, which are applied to the present disclosure.

FIG. 22 illustrates a communication system 1 applied to the present disclosure.

Referring to FIG. 22, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 23:
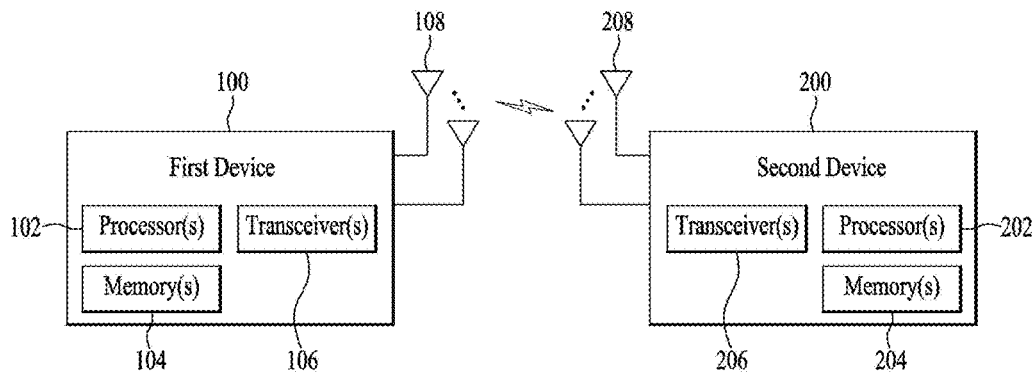

FIG. 23 illustrates wireless devices applicable to the present disclosure.

Referring to FIG. 23, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 24:
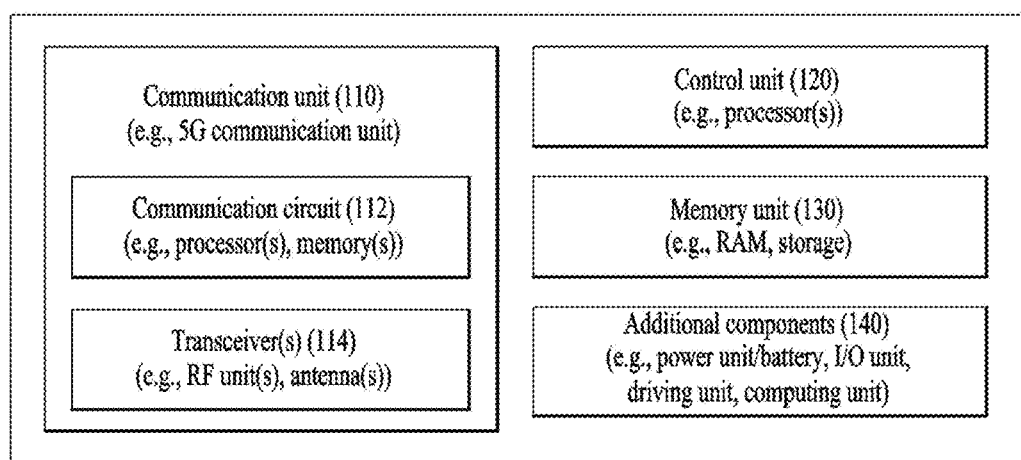

FIG. 24 illustrates another example of a wireless device applied to the present disclosure. The wireless device may be implemented in various forms according to a use case/service (refer to FIG. 22).

Referring to FIG. 24, wireless devices 100 and 200 may correspond to the wireless devices 100 and 200 of FIG. 23 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcasting terminal, a hologram device, a public safety device, an MTC device, a medical device, a FinTech device (or a finance device), a security device, a climate/environment device, the AI server/device (400 of FIG. 22), the BSs (200 of FIG. 22), a network node, or the like. The wireless device may be mobile or fixed according to a use case/service.

In FIG. 24, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 25:
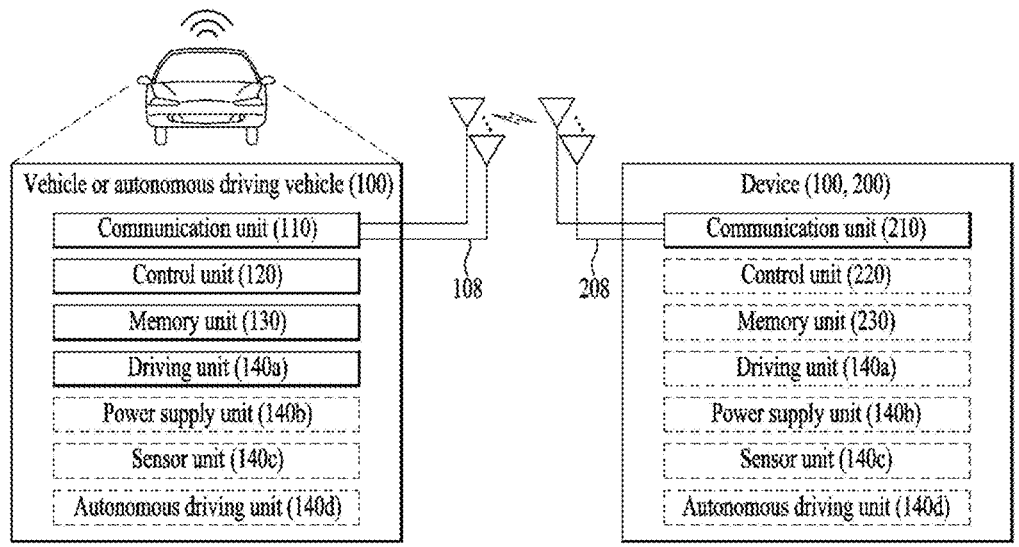

FIG. 25 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used for a UE, a BS, or other equipment in a wireless mobile communication system.

What is claimed is:

1. A method of transmitting a wireless signal by a user equipment in a wireless communication system, the method comprising:
   receiving, via a higher layer signal, a configuration information related to a maximum number N (>1) of Physical Downlink Shared Channels (PDSCHs) schedulable by a single Downlink Control Information (DCI);
   receiving a DCI having a scheduling information regarding K (≤N) PDSCHs; and
   transmitting an HARQ-ACK codebook including N Hybrid Automatic Repeat Request-Acknowledgement (HARQ-ACK) informations in response to the K PDSCHs based on the configuration information.

2. The method of claim 1, wherein the K PDSCHs are received on different cells in a same slot, respectively.

3. The method of claim 1, wherein the K PDSCHs are received in different slots of a same cell, respectively.

4. The method of claim 1, wherein the DCI further includes a first Downlink Assignment Index (DAI) and wherein the first DAI indicates a value related to a scheduling order and is changed in DCI unit.

5. The method of claim 4, wherein the first DAI indicates the value related to the scheduling order in PDSCH unit with reference to a reception timing of the DCI.

6. The method of claim 4, wherein the DCI further includes a second DAI, wherein the second DAI indicates a value related to a total scheduling number in PDSCH unit with reference to a reception timing of a PDSCH last received among the K PDSCHs.

7. A user equipment used in a wireless communication system, the user equipment comprising:
   at least one processor; and
   at least one computer memory operatively connected to the at least one processor and enabling the at least one processor to perform an operation when executed, the operation comprising:
      receiving, via a higher layer signal, a configuration information related to a maximum number N (>1) of a Physical Downlink Shared Channels (PDSCHs) schedulable by a single Downlink Control Information (DCI);
      receiving a DCI having a scheduling information regarding K (≤N) PDSCHs; and
      transmitting an HARQ-ACK codebook including N Hybrid Automatic Repeat Request-Acknowledgement (HARQ-ACK) informations in response to the K PDSCHs based on the configuration information.

8. The user equipment of claim 7, wherein the K PDSCHs are received on different cells in a same slot, respectively.

9. The user equipment of claim 7, wherein the K PDSCHs are received in different slots of a same cell, respectively.

10. The user equipment of claim 7, wherein the DCI further includes a first Downlink Assignment Index (DAI) and wherein the first DAI indicates a value related to a scheduling order and is changed in DCI unit.

11. The user equipment of claim 10, wherein the first DAI indicates the value related to the scheduling order in PDSCH unit with reference to a reception timing of the DCI.

12. The user equipment of claim 10, wherein the DCI further includes a second DAI, wherein the second DAI indicates a value related to a total scheduling number in PDSCH unit with reference to a reception timing of a PDSCH last received among the K PDSCHs.

13. An apparatus for a communication device, the apparatus comprising:
   at least one processor; and
   at least one computer memory operatively connected to the at least one processor and enabling the at least one processor to perform an operation when executed, the operation comprising:
      receiving, via a higher layer signal, a configuration information related to a maximum number N (>1) of a Physical Downlink Shared Channels (PDSCHs) schedulable by a single Downlink Control Information (DCI);
      receiving a DCI having a scheduling information regarding K (≤N) PDSCHs; and
      transmitting an HARQ-ACK codebook including N Hybrid Automatic Repeat Request-Acknowledgement (HARQ-ACK) informations in response to the K PDSCHs based on the configuration information.

14. The apparatus of claim 13, wherein the K PDSCHs are received on different cells in a same slot, respectively.

15. The apparatus of claim 13, wherein the K PDSCHs are received in different slots of a same cell, respectively.

16. The apparatus of claim 13, wherein the DCI further includes a first Downlink Assignment Index (DAI) and wherein the first DAI indicates a value related to a scheduling order and is changed in DCI unit.

17. The apparatus of claim 16, wherein the first DAI indicates the value related to the scheduling order in PDSCH unit with reference to a reception timing of the DCI.

18. The apparatus of claim 16, wherein the DCI further includes a second DAI, wherein the second DAI indicates a value related to a total scheduling number in PDSCH unit with reference to a reception timing of a PDSCH last received among the K PDSCHs.

* * * * *